(12) United States Patent
Brown et al.

(10) Patent No.: US 10,733,060 B2
(45) Date of Patent: *Aug. 4, 2020

(54) ASYNCHRONOUS LOCAL AND REMOTE GENERATION OF CONSISTENT POINT-IN-TIME SNAP COPIES IN CONSISTENCY GROUPS

(71) Applicant: International Business Machines Corporation, Armonk, NY (US)

(72) Inventors: Theresa M. Brown, Tucson, AZ (US); Nicolas M. Clayton, Warrington (GB); Joshua J. Crawford, Tucson, AZ (US); Nedlaya Y. Francisco, Tucson, AZ (US); Theodore T. Harris, Jr., Tucson, AZ (US); Gregory E. McBride, Vail, AZ (US); Carol S. Mellgren, Tucson, AZ (US); Damian Trujillo, Sahuarita, AZ (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,407

(22) Filed: Feb. 5, 2019

(65) Prior Publication Data

US 2019/0171528 A1     Jun. 6, 2019

Related U.S. Application Data

(63) Continuation of application No. 15/663,727, filed on Jul. 29, 2017, now Pat. No. 10,223,210.

(51) Int. Cl.
*G06F 11/14* (2006.01)
*G06F 3/06* (2006.01)

(52) U.S. Cl.
CPC .......... *G06F 11/1451* (2013.01); *G06F 3/065* (2013.01); *G06F 3/067* (2013.01);
(Continued)

(58) Field of Classification Search
CPC ........ G06F 3/0619; G06F 3/065; G06F 3/067; G06F 11/1451; G06F 11/1464; G06F 2201/84
See application file for complete search history.

(56) References Cited

U.S. PATENT DOCUMENTS 6,253,295 B1 * 6/2001 Beal ...................... G06F 3/0619
707/999.202
8,738,874 B2  5/2014 Nemoto et al.
(Continued)

FOREIGN PATENT DOCUMENTS

CN    102012789    4/2011
CN    102385543    3/2012

OTHER PUBLICATIONS

International Search Report and Written Opinion for International Application No. PCT/IB2018/055499, dated Oct. 31, 2018, 10 pp. [18.714PCT (Isr & Wo)].
(Continued)

*Primary Examiner* — Nicholas J Simonetti
(74) *Attorney, Agent, or Firm* — Konrad Raynes Davda & Victor LLP

(57) ABSTRACT

One general aspect of asynchronous local and remote generation of consistent point-in-time snap copies in consistency groups in accordance with the present description, is directed to receiving a local-remote pair point-in-time snap copy establish command to establish a local point-in-time snap copy in a local data storage system, and a remote point-in-time snap copy in a remote data storage system. In one aspect, establishment of the remote point-in-time snap
(Continued)

copy relationship may be delayed as a function of the state of a consistency group formation process upon receipt of the local-remote pair point-in-time snap copy establish command. As a result, consistency of the local-remote pair of point-in-time snap copies may be realized, notwithstanding an asynchronous relationship between the local and remote storage systems. Other features and aspects may be realized, depending upon the particular application.

24 Claims, 9 Drawing Sheets

(52) U.S. Cl.
CPC .......... *G06F 3/0617* (2013.01); *G06F 3/0619* (2013.01); *G06F 11/1464* (2013.01); *G06F 2201/84* (2013.01)

(56) References Cited

U.S. PATENT DOCUMENTS

| 8,819,362 | B1 | 8/2014 | Duprey et al. |
| 8,838,920 | B2 | 9/2014 | Harris, Jr. et al. |
| 2011/0060722 | A1 | 3/2011 | Li et al. |
| 2015/0081628 | A1 | 3/2015 | Brown et al. |
| 2015/0331716 | A1* | 11/2015 | Brown ...................... G06F 9/48 718/103 |
| 2017/0185323 | A1* | 6/2017 | Kaushik .............. G06F 11/1469 |

OTHER PUBLICATIONS

English translation of CN102012789A dated Apr. 13, 2011, pp. 15.
English translation of CN102385543A dated Mar. 21, 2012, pp. 5.
U.S. Publication No. 20110060722, dated Mar. 10, 2011, is an English Language Counterpart of CN Publication No. 102012789, dated Apr. 13, 2011.
U.S. Appl. No. 15/663,727, entitled "Asynchronous Local and Remote Generation of Consistent Point-In-Time Snap Copies in Consistency Groups", filed Jul. 29, 2017, by T.M. Brown et al., 65 pp. [18.714 (Appin)].
Notice of Allowance for U.S. Appl. No. 15/663,727, dated Oct. 15, 2018, 14 pp. [18.714 (NOA1)].
List of IBM Patents or Patent Applications Treated as Related, dated Feb. 13, 2019, pp. 2 [18/14C1 (Appendix P)].

* cited by examiner

ASYNCHRONOUS LOCAL AND REMOTE GENERATION OF CONSISTENT POINT-IN-TIME SNAP COPIES IN CONSISTENCY GROUPS

BACKGROUND OF THE INVENTION

1. Field of the Invention

The present invention relates to a computer program product, system, and method for asynchronous local and remote generation of consistent point-in-time snap copies in consistency groups.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Thus, data from a host to be stored in the data storage system is typically directed to a primary system at a local site and then replicated to secondary system which may be geographically remote system from the primary system.

The process of replicating, that is, copying data over to the secondary system can be setup in either a synchronous or asynchronous relationship between the primary system and the secondary system. In a synchronous relationship, any updates to the primary system are typically synchronized with the secondary system, that is, successfully copied over to the secondary system, before the primary system reports to the host that the data storage input/output operation has been successfully completed. As a result, data storage to a primary storage system and a secondary system in a synchronous relationship may adversely affect system performance of the host while the host awaits completion of the synchronous copy operations. In storage systems in which the primary and secondary systems are widely separated, delays to completion of the synchronous copy operations may be greater, which can further adversely affect host performance. For example, in storage systems in which the primary system and the secondary system are separated by a geographical distance of 300 kilometers (Km) or more, for example, there can be a delay of 3-5 seconds (or more) before the data is successfully replicated at the secondary system.

As a result, storage systems frequently employ an asynchronous relationship between a primary system and a secondary system, particularly if the secondary system is geographically distant from the primary system. In an asynchronous relationship, successful updates to the primary system are typically reported to the host as a successful storage input/output operation without waiting for the update to be replicated to the secondary system. As a result, the host need not wait for the data replication to the secondary system to be completed, and the performance of the host system may be enhanced accordingly.

As the name suggests, in an asynchronous relationship, the primary system and the secondary system may not be fully synchronized at any one time. Thus, data stored on the secondary system typically lags that stored in the primary system. Accordingly, new data stored on a primary system may not be stored on the secondary system for an interval of time such as 3-5 seconds, for example.

In data replication systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices.

A near instantaneous copy of a volume may be generated using a point-in-time snap copy function such as the IBM® FlashCopy function, for example. The point-in-time snap copy function creates a "snapshot" of the contents of a source volume as of a particular time in a target volume which may be referred to as the point-in-time snap copy volume. One version of a point-in-time snap copy function transfers the contents of the source volume to the point-in-time snap copy volume in a background copy operation.

A target bitmap having a bit for each track of the point-in-time snap copy volume, is used to indicate tracks which have not yet been transferred to the point-in-time snap copy volume. As the contents of each track of the source volume is copied to the target volume, the corresponding bit of the target bitmap is updated (typically reset) to indicate successful transfer of the contents for the associated track. Any read operations directed to a track of the point-in-time snap copy volume which has not yet received the contents of the corresponding track of the source volume, are redirected to obtain the contents of that track from the source volume. Accordingly, the contents of a point-in-time snap copy volume are immediately available albeit indirectly, before any tracks have actually been transferred to the target volume. Conversely, if the host directs an update to a track of the source volume before the contents of that track have been transferred to the point-in-time snap copy volume, the contents of the track of the source volume are transferred to the point-in-time snap copy volume before the update is permitted to overwrite the contents of that track of the source volume.

Another version of a point-in-time snap copy function omits the background copy operation. Thus, the contents of the source volume are not transferred to the point-in-time snap copy volume in a background copy operation. Accordingly, any read operations directed to a track of the point-in-time snap copy volume are usually redirected to obtain the contents of that track from the source volume. However, if the host directs an update to a track of the source volume, the contents of the track of the source volume are transferred to the point-in-time snap copy volume before the update is permitted to overwrite the contents of that track of the source volume.

In a synchronous data replication system, a point-in-time snap copy volume may be made of a primary volume at the primary system with respect to the contents of the primary volume as of a particular point-in-time, and a point-in-time snap copy volume may be made of a secondary volume at the secondary system with respect to the contents of the secondary volume as of the same point-in-time. Because the primary and secondary volumes are synchronized, the respective point-in-time snap copy volumes will also be synchronized and therefore consistent with each other notwithstanding that the point-in-time snap copy volumes are made in different places, that is, the primary system and the secondary system. In this manner, a pair of snap copies may be formed, one local and one remote, in which the local and remote snap copies are consistent with each other.

To maintain a degree of consistency of data across multiple volumes at a secondary system in an asynchronous data replication system, the IBM® Total Storage disk subsystem Peer-to-Peer Remote Copy (PPRC) function supports the concept of a PPRC consistency group. Volumes in a PPRC relationship that are configured into a PPRC Consistency Group are maintained to ensure that a group of updates made to volumes at the primary system are also eventually made on the volumes at the secondary system to maintain data consistency for those volumes of the group. Accordingly, consistency groups may be formed between volumes of the primary system and the secondary system which are consistent with respect to a particular set of updates or a particular point in time, notwithstanding the overall asynchronous relationship between the primary system and the secondary system.

A local point-in-time snap copy volume maybe made of a primary volume at the primary system with respect to the contents of the primary volume as of a particular point-in-time. Similarly, a remote point-in-time snap copy volume may be made of a secondary volume at the secondary system with respect to the contents of the secondary volume as of a particular point-in-time. However, because the primary and secondary volumes are not synchronized in an asynchronous data replication system, the respective local and remote point-in-time snap copy volumes may not be not be consistent with each other even if the secondary volume is part of a consistency group with respect to the primary volume. For example, a command to establish a pair of local and remote snap copies involving volumes of a consistency group being formed, may not be consistent with respect to each other. Hence, to provide a remote backup copy of a local point-in-time snap copy volume of a primary volume at the primary system, the point-in-time snap copy volume generated at the primary system is typically transferred over a network to the secondary system.

SUMMARY

One general aspect of asynchronous local and remote generation of consistent point-in-time snap copies in consistency groups in accordance with the present description, is directed to receiving a local-remote pair point-in-time snap copy establish command to establish a local point-in-time snap copy in a local data storage system, and a remote point-in-time snap copy in a remote data storage system. In one aspect, establishment of the remote point-in-time snap copy relationship may be delayed as a function of the state of a consistency group formation process upon receipt of the local-remote pair point-in-time snap copy establish command. As a result, consistency of the local-remote pair of point-in-time snap copies may be realized, notwithstanding an asynchronous relationship between the local and remote storage systems.

In one embodiment, operations include mirroring data asynchronously from a first data unit stored in a storage unit of a first storage system at a first location, to a second data unit stored in a storage unit of a second storage system at a second location, mirroring data asynchronously from a third data unit stored in a storage unit at the first location, to a fourth data unit stored in a storage unit at the second location, and receiving a command to establish a local-remote pair of point-in-time snap copy relationships including a local point-in-time snap copy relationship in the first storage system, from the first data unit as a snap copy source, to the third data unit as a snap copy target, and including a remote point-in-time snap copy relationship in the second storage system from the second data unit as a snap copy source, to the fourth data unit as a snap copy target.

In one aspect, the operations include, in response to the command initiating a local-remote pair of point-in-time snap copy relationships, determining a state of a consistency group formation process upon receipt of the command wherein a plurality of states includes an idle state and a draining state wherein an idle state exists in which no consistency group which includes the second and fourth data units is actively forming and wherein a draining state exists in which a consistency group which includes the second and fourth data units is actively forming, and delaying establishment of the remote point-in-time snap copy relationship if the state of a consistency group formation process is determined to be in a draining state in which a consistency group which includes the second and fourth data units is actively forming in a draining state upon receipt of the command. In one embodiment, the plurality of states further includes an increment complete state following completion of the draining state, wherein delaying establishment of the remote point-in-time snap copy relationship is terminated if the state of a consistency group formation process is determined to be in an increment complete state following a draining state in which the command was received.

In one aspect, the initiating a local-remote pair of point-in-time snap copy relationships further includes establishing the local point-in-time snap copy relationship independently of the state of a consistency group formation process. Accordingly, in one embodiment, the local point-in-time snap copy relationship may be established without significant delay.

In another aspect, the initiating a local-remote pair of point-in-time snap copy relationships includes reserving resources of the second storage system for subsequent establishment of the remote point-in-time snap copy relationship. In addition, initiating a local-remote pair of point-in-time snap copy relationships further includes establishing the remote point-in-time snap copy relationship using the resources of the second storage system reserved for subsequent establishment of the remote point-in-time snap copy relationship, if the state of a consistency group formation process is determined to be in an increment complete state following a draining state in which the command was received. In another aspect, the initiating a local-remote pair of point-in-time snap copy relationships further includes establishing the remote point-in-time snap copy relationship using the resources of the second storage system reserved for subsequent establishment of the remote point-in-time snap copy relationship, if the state of a consistency group formation process is determined to be in an idle state in which the command was received.

In yet another aspect, initiating a local-remote pair of point-in-time snap copy relationships further includes determining a snap copy sequence number as a function of a consistency group formation process upon receipt of the command, and associating the resource reserving for subsequent establishment of the remote point-in-time snap copy relationship to the determined snap copy sequence number. In addition, the initiating a local-remote pair of point-in-time snap copy relationships further includes associating the remote point-in-time snap copy relationship to the determined snap copy sequence number.

In one embodiment, the first data unit is a first volume and the second data unit is a second volume.

Implementations of the described techniques may include hardware, a method or process, or computer software on a computer-accessible medium. Other features and aspects may be realized, depending upon the particular application.

DETAILED DESCRIPTION

Figure 1:
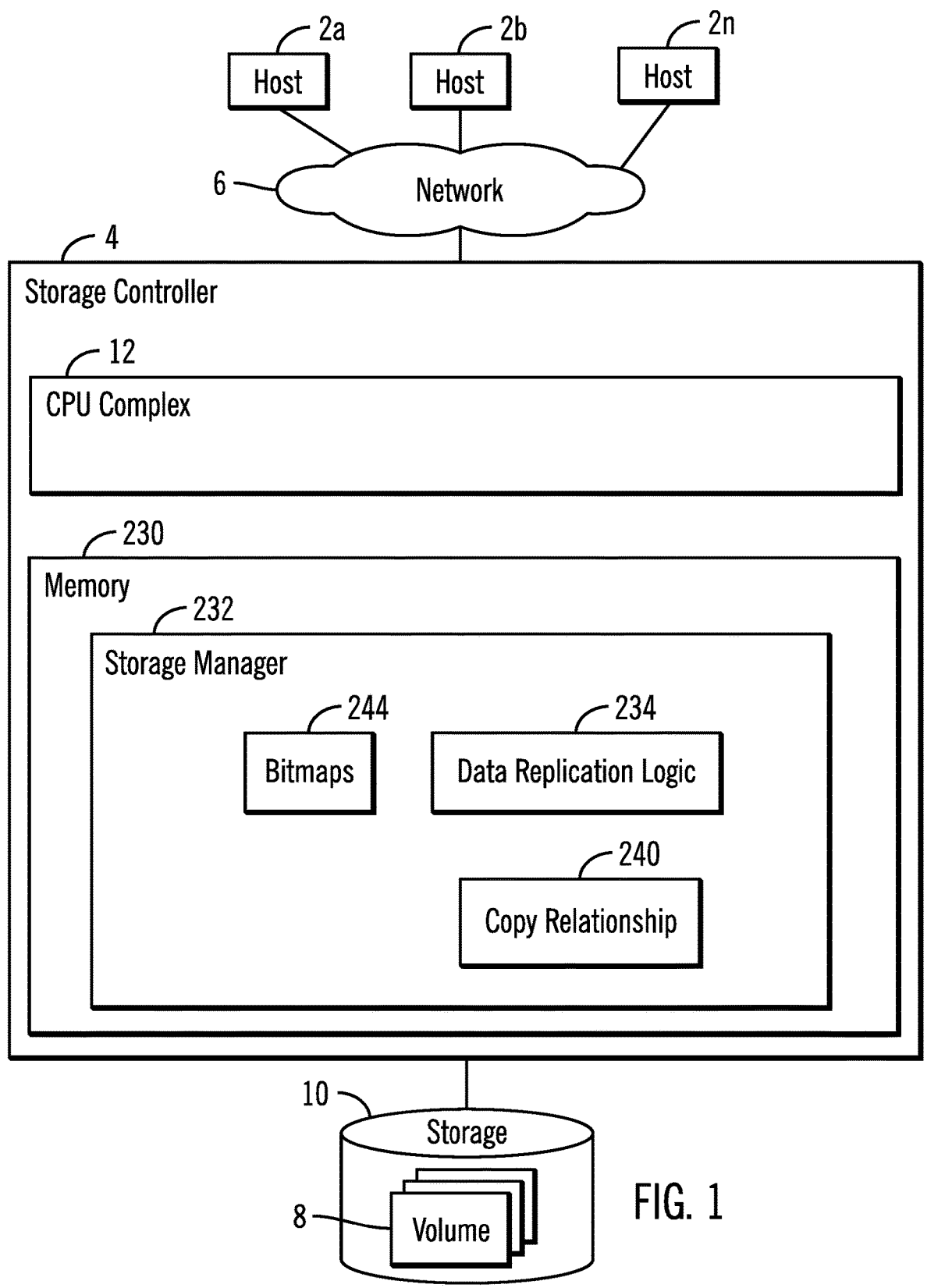
FIG. 1 illustrates an embodiment of a computing environment employing asynchronous local and remote generation of consistent point-in-time snap copies in consistency groups in accordance with one aspect of the present description.

A system of one or more computers may be configured for asynchronous local and remote generation of consistent point-in-time snap copies in consistency groups in accordance with the present description, by virtue of having software, firmware, hardware, or a combination of them installed on the system that in operation causes or cause the system to perform operations for asynchronous local and remote generation of consistent point-in-time snap copies in consistency groups. For example, one or more computer programs may be configured to perform asynchronous local and remote generation of consistent point-in-time snap copies in consistency groups by virtue of including instructions that, when executed by data processing apparatus, cause the apparatus to perform the actions.

As previously noted, in an asynchronous data replication system, a point-in-time snap copy volume may be made of a primary volume at the primary system with respect to the contents of the primary volume as of a particular point-in-time. Similarly, a point-in-time snap copy volume may be made of a secondary volume at the secondary system with respect to the contents of the secondary volume as of a particular point-in-time. However, because the primary and secondary volumes are frequently not fully synchronized in an asynchronous mirror relationship, the respective point-in-time snap copy volumes may not be synchronized and therefore may not be consistent with each other. Hence, to provide a backup copy of a point-in-time snap copy volume of a primary volume at the primary system, and to store the backup copy at the secondary system, the point-in-time snap copy volume generated at the primary system previously was transferred over a network to the secondary system.

In accordance with one aspect of the present description, it is recognized that in many applications, most of the data to form a point-in-time snap copy volume at the secondary system already resides on the secondary system due to the asynchronous mirror relationship. Accordingly, asynchronous local and remote generation of consistent first and second point-in-time snap copies in accordance with one embodiment of the present description, can obviate much of the transfer of data over a network in creating consistent first and second point-in-time snap copies located at different sites.

One general aspect of asynchronous local and remote generation of consistent point-in-time snap copies in consistency groups in accordance with the present description, is directed to receiving a local-remote pair point-in-time snap copy establish command to establish a local point-in-time snap copy in a local data storage system, and a remote point-in-time snap copy in a remote data storage system. In one aspect, establishment of the remote point-in-time snap copy relationship may be delayed as a function of the state of a consistency group formation process upon receipt of the local-remote pair point-in-time snap copy establish command. As a result, consistency of the local-remote pair of point-in-time snap copies may be realized, notwithstanding an asynchronous relationship between the local and remote storage systems.

In one embodiment, operations include determining a state of a consistency group formation process upon receipt of a local-remote snap copy pair command as at least one of a plurality of states wherein the plurality of states includes an idle state in which no consistency group which includes units of the command is actively forming, and a draining state in which a consistency group which includes units of the command is actively forming. In one aspect, establishment of the remote point-in-time snap copy relationship of the local-remote pair is not delayed if the state of the consistency group formation process is determined to be in an idle state in which a prior consistency group has been completed.

In a completed consistency group, a volume of the secondary storage will be consistent with respect to a volume of the primary storage. Hence, a remote snap copy of the secondary volume will be consistent with a local snap copy of the primary volume.

Conversely, establishment of the remote point-in-time snap copy relationship of the local-remote pair is delayed if the state of the consistency group formation process is determined to be in a draining state in which a consistency group being formed has not yet been completed. In one embodiment, the plurality of states further includes an increment complete state (also referred to as an idle state) following completion of the draining state, wherein delaying establishment of the remote point-in-time snap copy relationship is terminated if the state of a consistency group formation process is subsequently determined to be in an increment complete state following a draining state in which the command was received. As noted above, in a completed consistency group, a volume of the secondary storage will be consistent with respect to a volume of the primary storage. Hence, a remote snap copy of the secondary volume will be consistent with a local snap copy of the primary volume.

In another aspect, the initiating a local-remote pair of point-in-time snap copy relationships includes reserving resources of the second storage system for subsequent establishment of the remote point-in-time snap copy relationship. In addition, initiating a local-remote pair of point-in-time snap copy relationships further includes establishing the remote point-in-time snap copy relationship using the resources of the second storage system reserved for subsequent establishment of the remote point-in-time snap copy relationship, if the state of a consistency group formation process is determined to be in an increment complete state following a draining state in which the command was received. In another aspect, the initiating a local-remote pair of point-in-time snap copy relationships further includes establishing the remote point-in-time snap copy relationship using the resources of the second storage system reserved for subsequent establishment of the remote point-in-time snap copy relationship, if the state of a consistency group formation process is determined to be in an idle state when the local-remote pair establish command was received.

In one aspect, the initiating a local-local-remote pair of point-in-time snap copy relationships further includes establishing the local point-in-time snap copy relationship independently of the state of a consistency group formation process. Accordingly, a local snap copy relationship may be established without significant delay regardless of the state of a consistency group formation process in some embodiments. Other aspects and advantages may be realized, depending upon the particular application.

A system of one or more computers may be configured for asynchronous local and remote generation of consistent point-in-time snap copies in consistency groups in accordance with the present description, by virtue of having software, firmware, hardware, or a combination of them installed on the system that in operation causes or cause the system to perform asynchronous local and remote generation of consistent point-in-time snap copies in consistency groups operations. Thus, the operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

In the illustrated embodiment, a copy relationship identifies a source storage location, such as a primary storage location, and a target storage location, such as a secondary storage location, in which data stored at the source storage location is to be replicated or otherwise copied to the target storage location. Thus, as used herein, a source storage location and a target storage location are storage locations related by a copy relationship.

Furthermore, as used herein, the term "storage unit" refers to a storage location containing one or more units of data storage such as one or more volumes, cylinders, tracks, segments, extents, or any portion thereof, or other unit or units of data suitable for transfer. Thus, a source storage unit and the associated target storage unit may each be a storage volume. However, it is appreciated that a source storage unit and a target storage unit may each be of a size other than a volume, for example.

Figure 2:
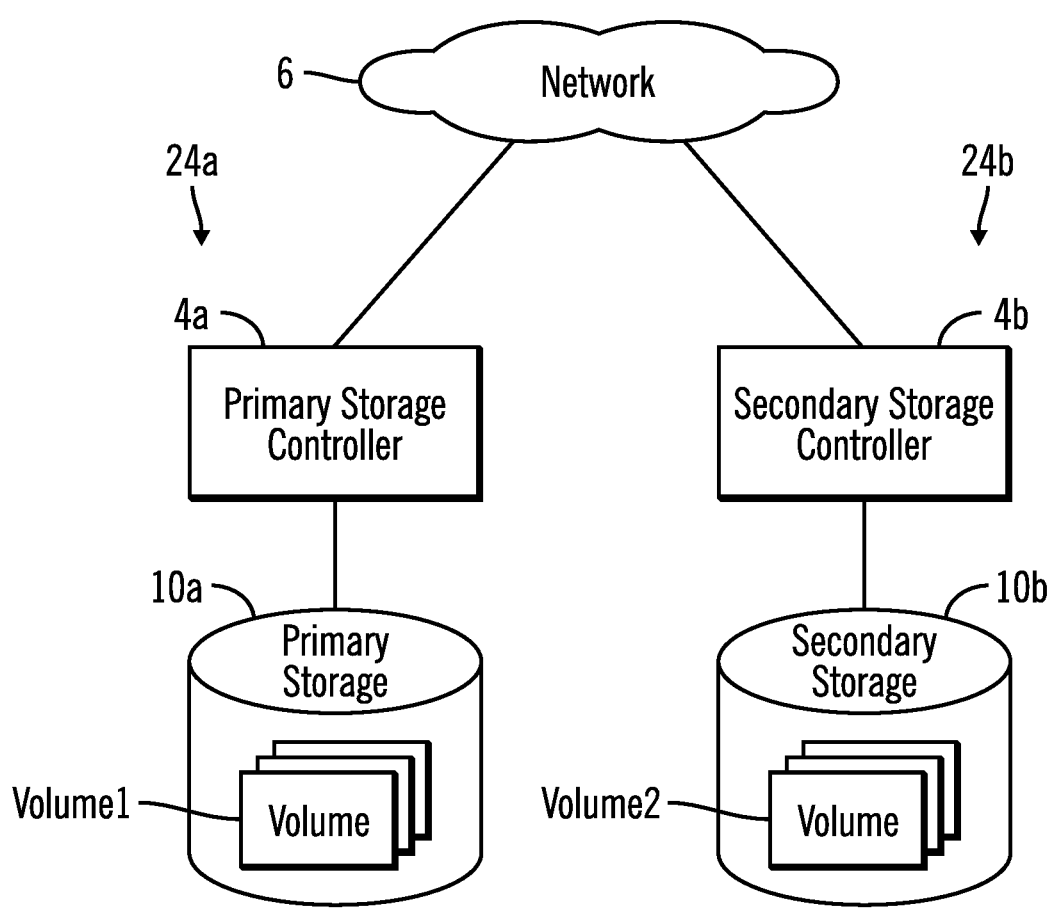
FIG. 2 illustrates an example of a storage system having a primary system and a secondary system employing asynchronous local and remote generation of consistent point-in-time snap copies in consistency groups in accordance with one aspect of the present description.

Implementations of the described techniques may include hardware, a method or process, or computer software on a computer-accessible medium. FIG. 1 illustrates an embodiment of a computing environment employing asynchronous local and remote generation of consistent point-in-time snap copies in consistency groups in accordance with the present description. A plurality of hosts $2a$, $2b$ . . . $2n$ may submit Input/Output (I/O) requests to one or more storage controllers or storage control units 4, $4a$ (FIG. 2), $4b$ (FIG. 2) over a network 6 to access data at volumes 8 (e.g., Logical Unit Numbers, Logical Devices, Logical Subsystems, etc.) in storage represented by one or more storage drives 10, $10a$, (FIG. 2), $10b$ (FIG. 2). Each storage controller 4, $4a$, $4b$ includes a CPU complex 12 (FIG. 1), including one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

In the configuration illustrated in FIG. 2, the storage controller $4a$ and the data storage $10a$ have been configured as a primary storage control unit and the primary storage, respectively, of a primary system $24a$. Similarly, the storage controller $4b$ and its data storage $10b$ have been configured as a secondary storage control unit and a secondary storage, respectively, of a secondary system $24b$. Hence, in the configuration depicted in FIG. 2, the storage controller $4a$ will be referred to as a primary storage controller or control unit $4a$, and the data storage $10a$ will be referred to as a primary storage $10a$. Similarly, the storage controller or control unit $4b$ will be referred to as a secondary storage controller or control unit 4b and the data storage 10b will be referred to as a secondary data storage 10b.

In a particular copy relationship, the source unit is often referred to as the primary and the target unit is often referred to as the secondary. Replication relationships are defined between storage units of the data storage 10a and 10b. Notwithstanding a reference to the data storage 10a as "primary" and the data storage 10b as "secondary," particular storage units of the data storage 10a and the storage 10b may play both a primary (or source role) and a secondary (or target role) depending upon the particular copy relationship.

Figure 3:
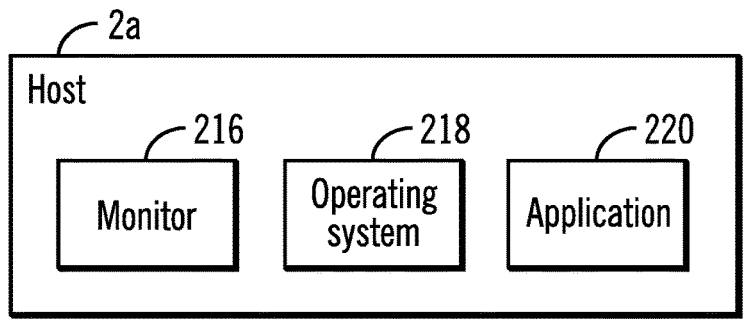
FIG. 3 illustrates an example of a host in the storage system of FIG. 1.

As noted above, the computing environment includes one or more hosts 2a, 2b, . . . 2n (FIG. 1) writing updates to the primary storage controller 4a (FIG. 2) for storage in the primary storage 10a. At least one such host such as the host 2a, has in this embodiment, storage management functions including a monitor program 216 (FIG. 3) to monitor failures in the availability of the primary storage controller 4a (FIG. 2) and its associated data storage 10a. In some embodiments, the monitor program 216 may be operated in a device apart from the hosts.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 6.

A typical host as represented by the host 2a (FIG. 3) includes an operating system 218 and an application 220 that reads data from and writes updates via a storage controller 4a, 4b to the primary storage 10a or secondary storage 10b. A host which includes the monitor program 216 may omit update writing applications 220 in some embodiments.

Figure 4:
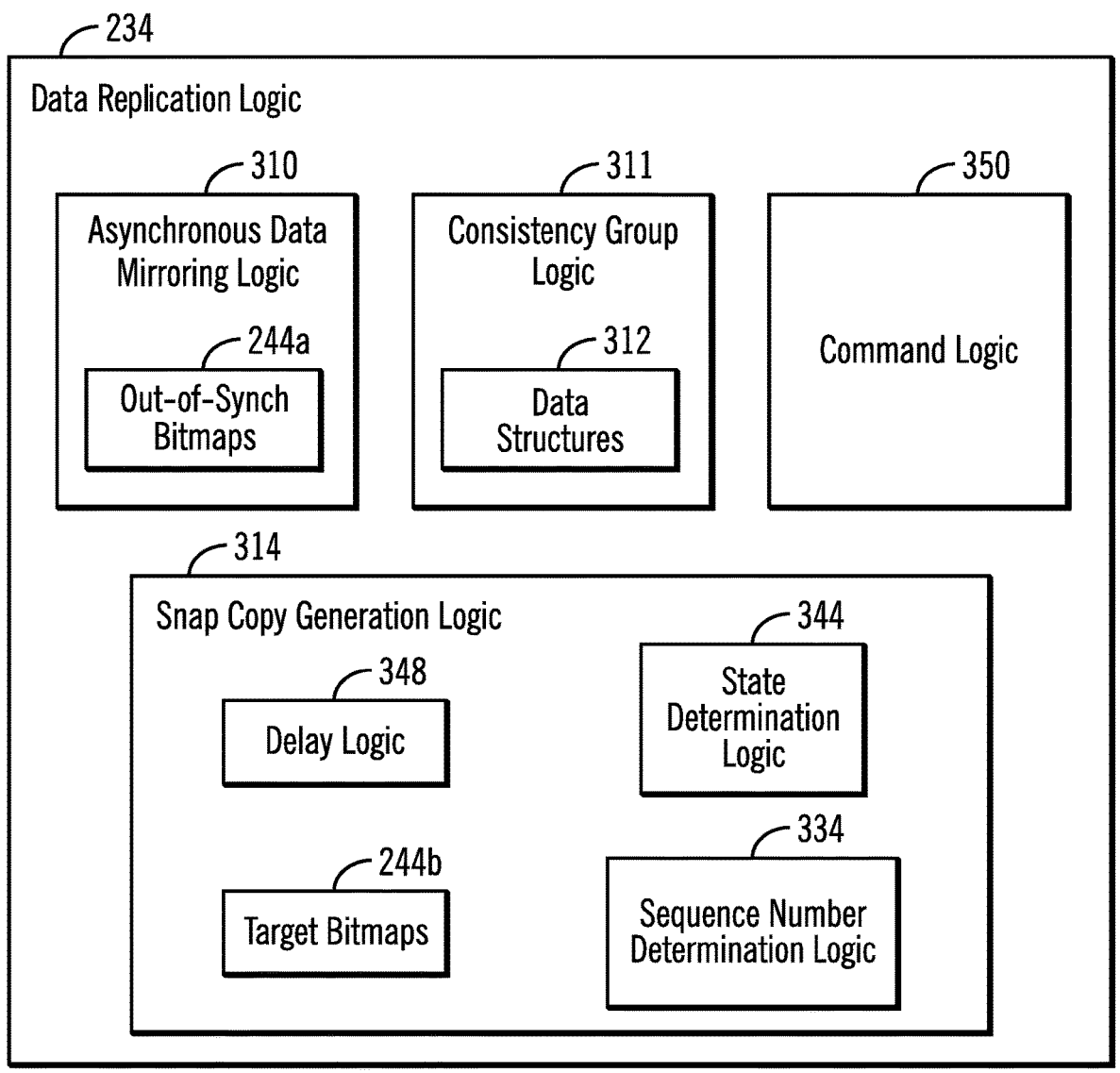
FIG. 4 illustrates an embodiment of data replication logic in accordance with one aspect of the present description.

Referring to FIGS. 1, 2, and 4 the storage controllers 4 (FIG. 1), 4a (FIG. 2), 4b each have a memory 230 (FIG. 1) that includes a storage manager 232 for managing storage operations including data replication operations from a primary volume1 of a primary system 24a to a secondary volume2 at a secondary system 24b. A data replication logic 234 of the storage manager 232 is configured to generate consistent copies such as point-in-time snap copies of the primary volume1 of primary system. The pair of volumes, volume1, volume2 are in an asynchronous copy relationship such that updates to the primary volume1 are asynchronously mirrored to the secondary volume2. In one aspect of the present description, notwithstanding the asynchronous relationship, a first, local point-in-time snap copy may be made of the primary volume1 and a second, remote point-in-time snap copy may be made consistent with the local point-in-time snap copy as of a particular point-in-time.

In the illustrated embodiment, the storage manager 232 including the data replication logic 234, is depicted as software stored in the memory 230 and executed by the CPU complex 12. However, it is appreciated that the logic functions of the storage manager 232 may be implemented as hardware, software, firmware or combinations of one or more thereof, depending upon the particular application.

One or more copy relationships 240, which may be maintained by the data replication logic 234 for the primary and secondary storage controllers 4a, 4b (FIG. 2) associate primary storage locations in the primary storage 10a and corresponding secondary storage locations in the secondary storage 10b, such that updates to the primary storage 10a locations are copied to the corresponding secondary storage 10b locations. For example, source storage locations in a primary storage volume1 (FIG. 2) of storage 10a may be mirrored in a mirror data replication operation to target storage locations of a secondary volume2 of the storage 10b pursuant to a mirror copy relationship 240 (FIG. 1).

In the illustrated embodiment, a copy relationship 240 comprises a peer-to-peer mirror relationship for a pair of storage locations in which updates to the primary (source) storage locations of the mirror relationship 240 are mirrored to the secondary (target) storage locations of the mirror relationship 240. It is appreciated that other types of copy relationships may be established, depending upon the particular application. For example, the copy relationships 240 may include point-in-time snap copy relationships.

In connection with a copy relationship 240 in an asynchronous data replication mode of the data replication logic 234, updates to the primary storage locations of the primary storage 10a may be indicated in a bitmap of a set of bitmaps 244, which is an out-of-sync (OOS) bitmap in the illustrated embodiment. Bits of the OOS bitmap are cleared as the storage manager 232 copies updates indicated in the OOS bitmap to the corresponding storage locations of the secondary storage 10b of secondary storage control unit 4b.

The storage manager 232 accesses updates to the primary storage 10a to write to the corresponding storage locations in the storage 10b. In some applications, the copying and relationship functions may be performed by devices external to the storage systems 24a, 24b (FIG. 2), such as the hosts, for example. In the illustrated embodiment, one copying relationship of the relationships 240 is a mirroring process in which each write update to the primary storage 10a is mirrored over to the secondary storage 10b. In the asynchronous mode of the illustrated embodiment, the I/O operation insofar as the host initiating the operation is concerned, is considered to be complete upon successful write of the update to the primary storage 10a. Accordingly, the host may be notified that the I/O operation was successfully completed notwithstanding that the update data has not yet been mirrored to the secondary storage 10b.

Periodically, volumes in a relationship 240 may be configured into a consistency group by the data replication logic 234 to ensure that a group of updates made to volumes at the primary system are also eventually made on the volumes of the consistency group to maintain data consistency as of a particular point in time or a particular set of data for those volumes of the group. Accordingly, additional updates to an OOS bit map may be stopped at a particular point in time to form a consistency group of volumes of the secondary system with respect to volumes of the primary system as of a particular point-in-time. Any unprocessed updates as indicated by the OOS bit map are transferred to the secondary storage so that the volumes of the consistency group are consistent as of the point in time at which updates were no longer added to the OOS bit map.

The interval of time of the consistency group formation process in which incremental updates indicated by the OOS bitmap are copied to the secondary storage and the OOS bitmap is updated (bits reset) to indicate such transfer, is referred to as "draining" the OOS bitmap. A second bitmap referred to as a Change Recording bitmap maintains a record of the tracks of the source volume that were updated (changed) during the consistency group drain time. When a consistency group is completed, the OOS bitmap of the consistency group is all zeros and the Change Recording bitmap indicates the updated tracks that were held back for the next consistency group. At this time, the Change Recording bitmap becomes the OOS bitmap for the mirror relationship and these updated tracks are mirrored to the remote volume along with any other updates that happen until the next consistency group is formed. The period following the draining interval until the next consistency group is formed, is referred to as an idle period for consistency group formation.

In contrast to the asynchronous mode, in a synchronous mode, an I/O operation which performed a write operation to the primary storage 10a is not considered complete until the mirror operation is completed, that is, it is not complete until the update data has been successfully replicated to the secondary storage 10b. Should the mirror operation fail such that the update is not successfully mirrored to the storage 10b, the host may be notified that the update operation was not successfully completed.

The storage manager 232 in one embodiment may transfer data from the primary storage 10a to the secondary storage 10b in tracks. As used herein, the term track may refer to a track of a disk storage unit but may also reference to other units of data configured in the storage 10a, 10b, such as a bit, byte, word, segment, page, block (such as a Logical Block Address (LBA)), etc., which may be a part of a larger grouping of data units, such as a volume, logical device, etc.

In one embodiment, the storage devices 10a, 10b may be comprised of one or more sequential access storage devices, such as hard disk drives and magnetic tape or may include non-sequential access storage devices such as solid state drives (SSD), for example. Each storage device 10a, 10b may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

One mode of the data replication logic 234 managing the copy relationships, may be implemented with asynchronous copy operations, such as a peer-to-peer remote copy (PPRC) program modified as appropriate in accordance with present description. An example of a PPRC program is the IBM Tivoli Productivity Center for Replication copy program that enables the switching of updates from the primary storage 10a to the secondary storage 10b. Suitable asynchronous mirroring programs include XRC (or zGM) modified as appropriate in accordance with present description. The described operations may be implemented with other programs such as other copy programs or other global recovery programs modified as appropriate in accordance with present description.

The system components 2a, 2b . . . 2n, 4, 4a, 4b, 10, 10a, 10b are connected to the network 6 which enables communication among these components. Thus, the network 6 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 2a, 2b, . . . 2n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

FIG. 4 depicts one embodiment of data replication logic 234 of the storage manager 232 (FIG. 1) of the primary storage controller 4a (FIG. 2). The secondary storage controller 4b (FIG. 2) of the secondary storage system may include a similar storage manager 232 and data replication logic 234.

Figure 5A:
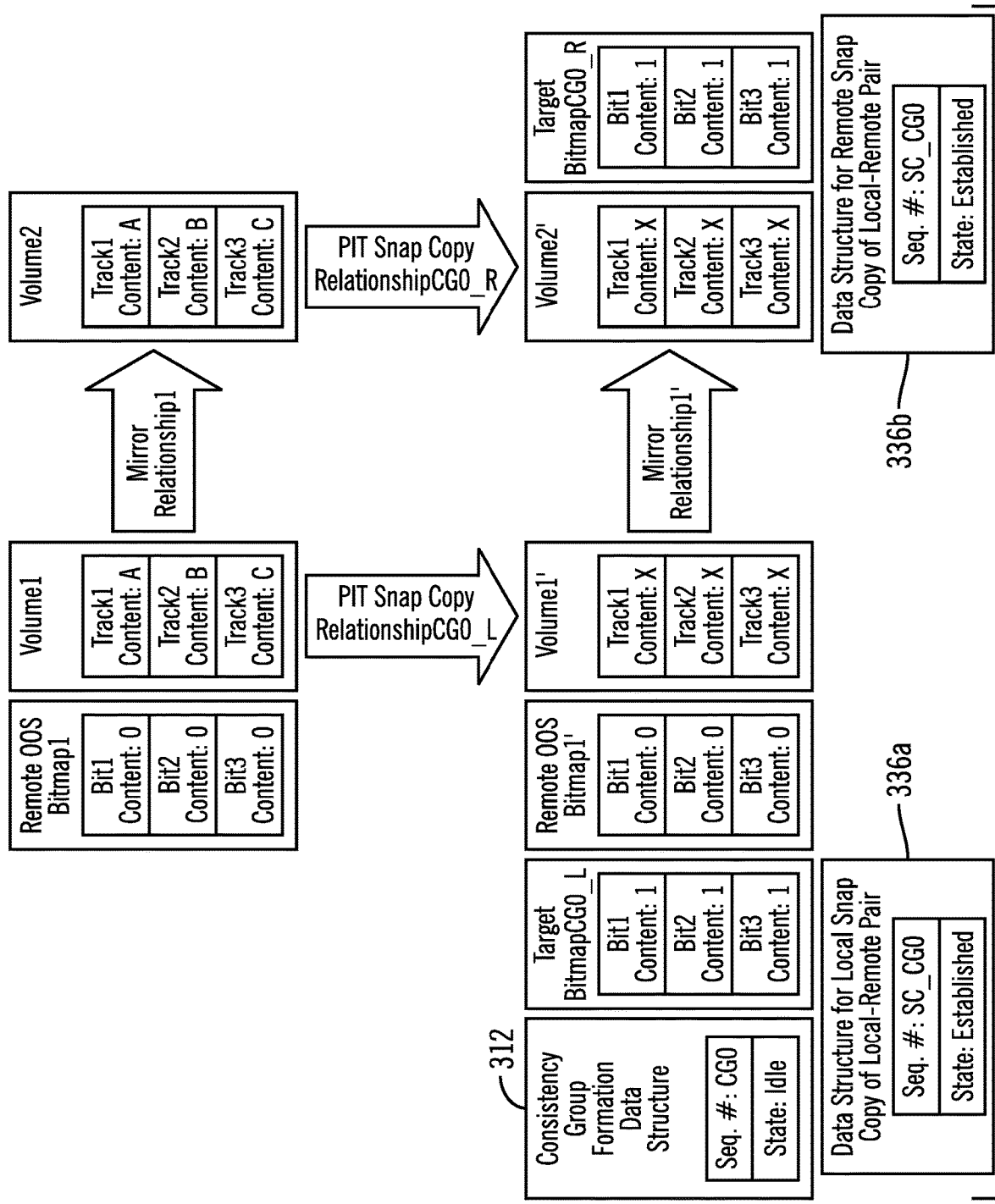
FIGS. 5a-5c depict examples of volumes, relationships and associated data structures in connection with operations of the data replication logic of FIG. 4.
Figure 5B:
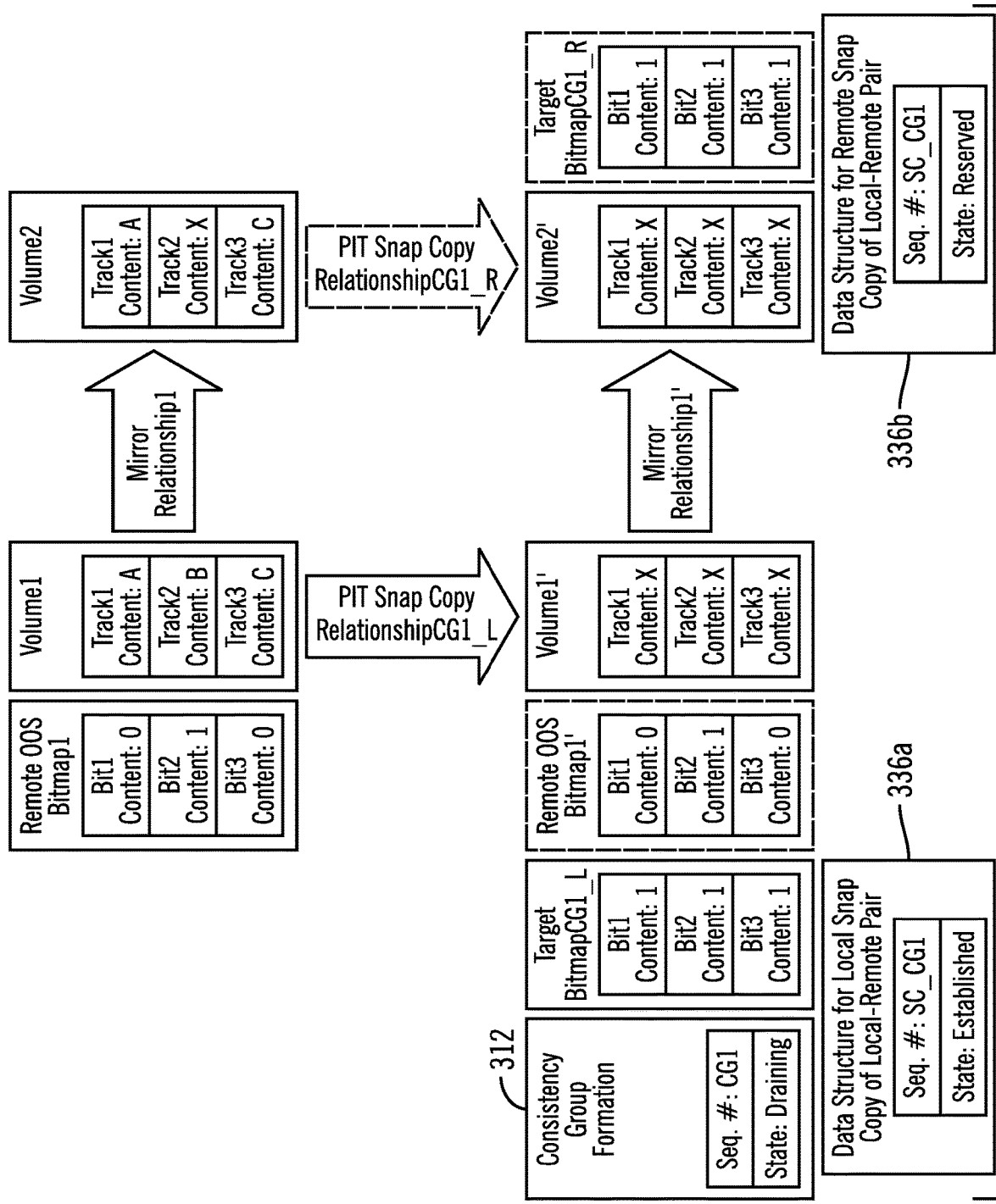
Figure 5C:
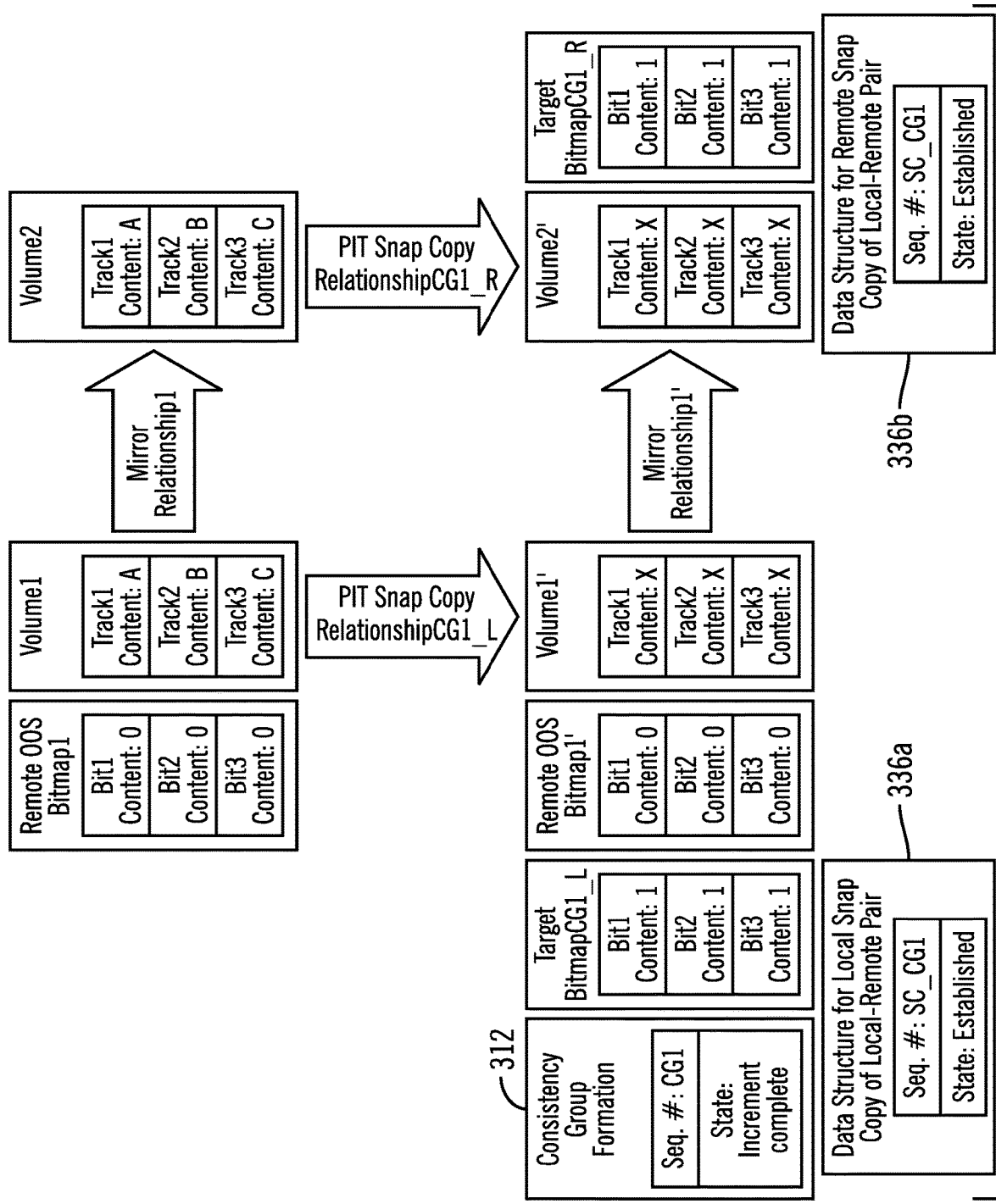

In this embodiment, the data replication logic 234 includes asynchronous data mirroring logic 310 configured to asynchronously mirror data from a first data unit such as a primary volume1 (FIG. 5a) having representative tracks, track1-track3, for example, of a first storage unit such as the primary storage 10a (FIG. 2), for example, to a second data unit such as a secondary volume2 (FIG. 5a) having representative tracks, track1-track3, for example, of a second storage unit such as the secondary storage 10b, for example. In the examples of FIGS. 5a-5c, the asynchronous mirroring of data from the primary volume1 to the secondary volume2 is represented by an arrow labeled "mirror relationship1". The data mirroring logic 310 of the data replication logic 234 in mirroring data from the primary volume1 to the secondary volume2, is further configured to generate a remote out-of-synch (OOS) bitmap1 of bitmaps 244a (FIG. 4) having representative bits, bit1-bit3 indicating remaining tracks to be mirrored from the primary volume1 to the secondary volume2.

Figure 6:
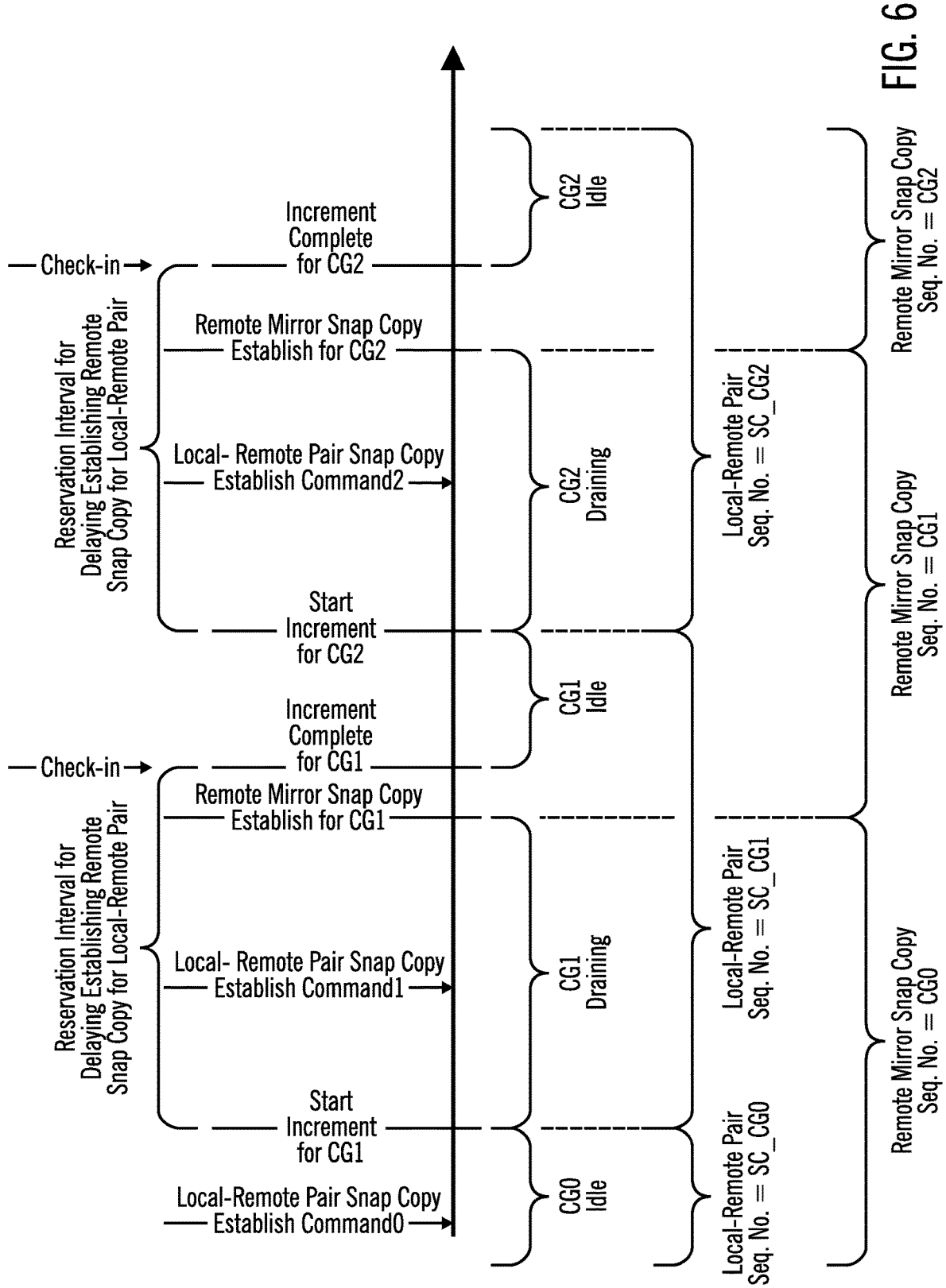
FIG. 6 depicts a timeline example of operations of the delay logic of the data replication logic of FIG. 4.

In the example of FIGS. 5a, 6, volume1 and volume2 are configured into a consistency group CG0 by a consistency group logic 311 to ensure that a group of updates made to volume1 at the primary system are also eventually made on volume2 of the consistency group CG0 to maintain data consistency as of a particular point in time or a particular set of data for those volumes of the group. Accordingly, additional updates to the OOS bitmap1 may be stopped at a particular point in time to form the consistency group CG0 of volume2 of the secondary system with respect to volume1 of the primary system as of a particular point-in-time. Any unprocessed updates as indicated by the OOS bitmap1 are transferred to the secondary storage so that volume2 of the consistency group is consistent with volume1 as of the point in time at which updates were no longer added to the OOS bitmap1.

Asynchronous mirroring of data from a primary volume1' to a secondary volume2' is represented by an arrow labeled "mirror relationship1'". The data mirroring logic 310 of the data replication logic 234 in mirroring data from the primary volume1' to the secondary volume2', is further configured to generate a remote out-of-synch (OOS) bitmap1' of bitmaps 244a (FIG. 4) having representative bits, bit1-bit3 indicating remaining tracks to be mirrored from the primary volume1' to the secondary volume2'.

FIG. 6. depicts a timeline of the sequential formation of various consistency groups as indicated by the consistency group sequence numbers CG0, CG1, CG2 . . . . For example, in the timeline of FIG. 6, following an idle period "CG0 idle" in which the formation of the consistency group CG0 was previously completed, formation of a new consistency group CG1 starts at a point-in-time "start increment for CG1" and is completed at a point-in-time "increment complete for CG1, followed by another idle period "CG1 idle."

As previously mentioned, incremental updates to the primary storage locations of the primary storage 10a may be indicated in an out-of-sync (OOS) bitmap1 (FIG. 5a) of the set of bitmaps 244 (FIG. 1). Bits of the OOS bitmap1 are cleared by the consistency group logic 311 (FIG. 4) as incremental updates indicated in the OOS bitmap are copied to the corresponding storage locations of the secondary storage 10b (FIG. 2) of secondary storage control unit 4b. The interval of time of the consistency group formation process, starting at the point-in-time "start increment" in which incremental updates are copied to the secondary storage and the OOS bitmap1 is updated, is referred to as "draining" the OOS bitmap1. For example, the interval of time, CG1 draining (FIG. 6) of the consistency group formation process for consistency group CG1, starts at the point-in-time "start increment for CG1" and represents the interval in which incremental updates on the primary volumes of the consistency group CG1 are copied to the secondary volumes of the secondary storage and the OOS bitmap1 (FIG. 5b) is updated.

In the example of FIGS. 5b, 6, volume1 and volume2 are configured into the consistency group CG1 by the consistency group logic 311 to ensure that a group of updates made to volume1 at the primary system are also eventually made on volume2 of the consistency group CG1 to maintain data consistency as of a particular point in time ("Start Increment for CG1) or a particular set of data for those volumes of the group. Accordingly, additional updates to the OOS bitmap1 may be stopped at a particular point in time to form the consistency group CG1 of volume2 of the secondary system with respect to volume1 of the primary system as of a particular point-in-time. Any unprocessed updates as indicated by the OOS bitmap1 are transferred to the secondary storage so that volume2 of the consistency group is consistent with volume1 as of the point in time at which updates were no longer added to the OOS bitmap 1.

This draining interval (CG1 draining) is complete once the OOS bitmap1 (FIG. 6) is fully drained (FIG. 5c) such that all incremental updates of the consistency group have been successfully copied from the primary storage to the secondary storage and as a result, all bits of the OOS bitmap1 (FIG. 5c) have been reset. At that time, the secondary storage may establish a snap copy (referred to as a "remote mirror snap copy in the embodiment of FIG. 6) of the remote volumes of the consistency group. Each remote mirror snap copy is assigned a sequence number. Thus, upon completion of the draining interval of consistency group CG1, for example, the remote mirror snap copy formed at the point-in-time "remote mirror snap copy establish for CG1" is assigned a sequence number "CG1" as indicated in the timeline of the embodiment of FIG. 6.

Once the remote mirror snap copy has been established as indicated in the timeline of FIG. 6, the increment portion of the consistency group formation process may be deemed complete ("increment complete") for the consistency group being formed. Thus, another "idle" interval follows until the next-in-sequence consistency group formation process is started.

For example, the draining interval, CG1 draining, is complete once the OOS bitmap1 for consistency group CG1 is fully drained as shown in FIG. 5c, such that all incremental updates of the primary volume1 of the consistency group CG1 have been successfully copied from the primary storage to the secondary storage and as a result, all bits of the OOS bitmap1 have been reset as shown in FIG. 5c. At that time, the secondary storage may generate a snap copy, as indicated by the point-in-time "remote mirror snap copy establish for CG1" in the embodiment of FIG. 6, of the remote volumes of the consistency group. Once the remote mirror snap copy has been established as indicated in the timeline of FIG. 6, the increment portion of the consistency group formation process for consistency group CG1 may be deemed complete (as indicated by the point-in-time "increment complete for CG1"). Thus, the idle interval "CG1 idle" follows until the next-in-sequence consistency group formation process is started.

The consistency group logic 311 (FIG. 4) is further configured to associate a consistency group sequence number to each consistency group formation process as depicted in FIG. 6. The consistency group logic 311 stores the consistency group sequence number and the state of the consistency group formation process in progress in a consistency group formation data structure 312 (FIG. 4). Thus, in the example of FIG. 5a, the consistency group logic 311 stores the consistency group sequence number CG0 and the state "idle" of the consistency group formation process in progress in corresponding sequence number and state fields of the consistency group formation data structure 312. In the illustrated embodiment, the idle state also represents a consistency group complete state.

Figure 7:
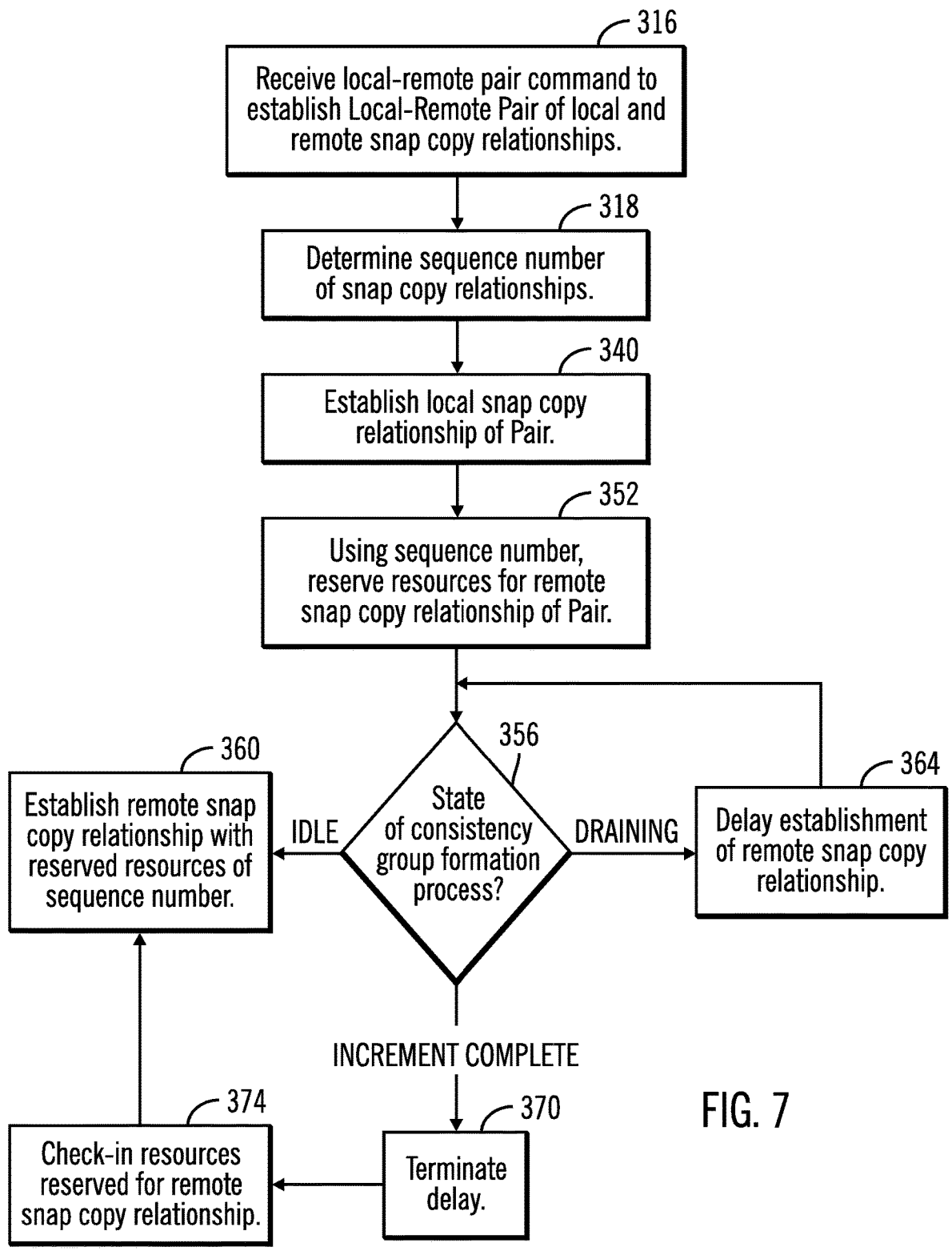
FIG. 7 depicts another example of operations of the data replication logic of FIG. 4.

FIG. 7 shows one embodiment of operations of the data replication logic 234 employing asynchronous local and remote generation of consistent point-in-time snap copies in consistency groups in accordance with one aspect of the present description. In one operation, a snap copy generation logic 314 (FIG. 4) of the data replication logic 234 is configured to receive (block 316, FIG. 7) a local-remote pair establish command from, for example, a host 2a, to establish a local-remote pair of snap copy relationships which may be part of a consistency group depending upon when the local-remote pair establish command was received. In the example of FIGS. 5a, 6, a local-remote pair snap copy establish command0 was received in the CG0 idle period following completion of the consistency group CG0 but prior to the formation of a new consistency group CG1. Local-remote establish Command0 commands the establishment of a local snap copy of volume1 of the local storage system 24a and a remote snap copy of volume2 of the remote storage system 24b. At the time of receipt of the local-remote establish command0, volume2 is in the consistency group CG0 with respect to volume1 in this example.

In one aspect of the present description, the local-remote pair of snap copy relationships established in response to the local-remote pair establish command are assigned a snap copy sequence number, such as the snap copy sequence number SC_CG0 in the example of FIGS. 5a, 6, which are a function of the particular consistency group formation process, such as the consistency group formation process CG0 idle in the example of FIGS. 5a, 6, when the local-remote pair establish command, such as the local-remote pair establish command0 in the example of FIGS. 5a, 6, was received. Thus, in another operation, the snap copy generation logic 314 determines (block 318, FIG. 7) a snap copy sequence number of the snap copy relationships of the local-remote pair to be established in response to the local-remote pair establish command.

In this embodiment, the snap copy generation logic 314 further includes sequence number determination logic 334 (FIG. 4) configured to in response to the received local-remote pair snap copy establish command, obtain from the data structure 312 of the consistency group logic 311, the consistency group sequence number of the consistency group formation process in progress at the time of receipt of the local-remote pair establish command, and to further determine a snap copy sequence number as a function of the particular consistency group formation process in progress at the time of receipt of the local-remote pair establish command. In the example of FIGS. 5a, 6, the sequence number determination logic 334 in response to the local-remote pair establish command0 (FIGS. 5a, 6), obtains from the data structure 312 of the consistency group logic 311, the consistency group sequence number CG0 of the consistency group formation process in progress at the time of receipt of the local-remote pair establish command0, and determines a snap copy sequence number SC_CG0 as a function of the particular consistency group formation process (CG0 idle) in progress at the time of receipt of the local-remote pair establish command0. The snap copy sequence number SC_CG0 is stored in a snap copy sequence number field of a data structure 336a (FIG. 5a) for the local snap copy of the local-remote snap copy pair.

FIG. 5a depicts the establishment of a local-remote pair of snap copy relationships in response to the local-remote pair establish command0 using the determined snap copy sequence number SC_CG0. The local-remote pair of snap copy relationships established in response to the local-remote pair establish command0, include a local point-in-time snap copy relationship as represented by an arrow labeled "PIT snap copy relationshipCG0_L" in the primary storage system 24a, from a data unit such as the volume 1 as a snap copy source, to another data unit such as the volume 1' as a snap copy target in the primary storage system 24a (FIG. 2). In one embodiment, the snap copy generation logic 314 (FIG. 4) is further configured to, in establishing the local point-in-time snap copy relationship, here PIT snap copy relationshipCG0_L, generate a local target bitmapCG0_L of bitmaps 244b (FIG. 4) indicating tracks which have not been copied from the primary volume1 to the point-in-time snap copy volume 1' as of a particular point-in-time.

The local-remote pair of snap copy relationships established in response to the local-remote pair establish command0 further include a remote point-in-time snap copy relationship as represented by an arrow labeled "PIT snap copy relationshipCG0_R" in the secondary storage system 24b (FIG. 2) from a data unit such as the volume2 as a snap copy source, to another data unit volume2' as a snap copy target in the secondary storage system 24b (FIG. 2). In one embodiment, snap copy generation logic 314 of the secondary controller is configured to, in establishing the remote point-in-time snap copy relationship, PIT snap copy relationshipCG0_R, generate a remote target bitmapCG0_R of bitmaps 244b indicating tracks which have not been copied from the primary volume2 to the point-in-time snap copy volume 2' as of a particular point-in-time.

The snap copy generation logic 314 (FIG. 4) of the primary storage controller 4a (FIG. 2) is configured to initiate and establish (block 340, FIG. 7) the local point-in-time snap copy relationship of the local-remote pair independently of the state of a consistency group formation process. Accordingly, in the example of FIGS. 5a, 6, the state of the point-in-time snap copy relationship CG0__L is stored as "Established" in a state field of the data structure 336a (FIG. 5a) for the local snap copy of the local-remote snap copy pair, indicating that the local snap copy having the sequence number SC_CG0 (of the point-in-time snap copy relationship CG0_L) of the local-remote snap copy pair has been established.

Conversely, in one aspect of the present description, the establishment of the remote point-in-time snap copy relationship of the local-remote pair of snap copy relationships may be delayed as a function of the state of the consistency group formation process in progress at the time of receipt of the local-remote pair snap copy establish command. However, notwithstanding a delay in the establishment of the remote point-in-time snap copy relationship of the local-remote pair of snap copy relationships, both snap copy relationships, local and remote, of the local-remote pair of snap copy relationships may be reported to the host which issued the local-remote snap copy pair establish command as established even though the remote snap copy relationship may not yet have been established but instead may have been delayed.

Thus, the snap copy generation logic 314 (FIG. 4) of the primary storage controller 4a (FIG. 2) further includes state determination logic 344 configured to determine a state of a consistency group formation process upon receipt of the local-remote pair establish command. Delay logic 348 of the snap copy generation logic 314 is configured to delay establishment of the remote point-in-time snap copy relationship of the local-remote pair of snap copy relationships as a function of the state of the consistency group formation process in progress at the time of receipt of the local-remote pair snap copy establish command, as determined by the state determination logic 344.

In one embodiment, the plurality of states includes an idle state such as the idle state "CG0 idle" in the example of FIGS. 5a, 6, in which the prior consistency group CG0 has completed and the formation of the next in sequence consistency group CG1 has not yet started as shown in the timeline of FIG. 6. Another state of the plurality of states further includes a draining state such as the draining state, "CG1 draining" in the example of FIGS. 5b, 6, in which the consistency group CG1 being formed has not yet completed. As explained in greater detail below, the delay logic 348 is further configured to delay establishment of the remote point-in-time snap copy relationship if the state of a consistency group formation process is determined to be in a draining state upon receipt of the local-remote pair establish command, and if the consistency group being formed includes data units of the local-remote pair of snap relationships of the local-remote pair snap copy establish command.

In connection with potential delay of establishment of the remote point-in-time snap copy relationship, command logic 350 (FIG. 4) of the data replication logic 234 is configured to command the secondary storage controller 4b (FIG. 2) to reserve (block 352, FIG. 7) resources of the secondary storage controller for eventually establishing the remote snap copy relationship of the local-remote pair. The resources are reserved using the sequence number determined (block 318, FIG. 7) for the local-remote pair.

In one embodiment, the command logic 350 of the data replication logic 234 is configured to issue a resource reservation command to the secondary storage controller 4b in response to the local-remote pair snap copy establish command, to reserve resources of the secondary storage system for subsequent establishment of the remote point-in-time snap copy relationship of the local-remote pair. Further in response to the resource reservation command, the determined snap copy sequence number (block 318, FIG. 7) is stored in a snap copy sequence number field of a data structure 336b (FIG. 5a) for the remote snap copy of the local-remote snap copy pair. Thus, in the example of FIGS. 5a, 6, in response to the resource reservation command issued in response to the local-remote pair establish command0, the snap copy sequence number SC_CG0 is stored in the snap copy sequence number field of a data structure 336b (FIG. 5a) for the remote snap copy of the local-remote snap copy pair.

The state determination logic 344 (FIG. 4) determines (block 356, FIG. 7) the state of a consistency group formation process upon receipt of the local-remote pair establish command. In the example of FIG. 5a, the state determination logic 344 obtains in response to the local-remote pair establish command0, from the data structure 312 (FIG. 5a) of the consistency group logic 311, the state, CG0 idle, of the consistency group formation process in progress. The command logic 350 is configured to command the secondary storage controller to establish the remote point-in-time snap copy relationship of the local-remote pair in association with the determined snap copy sequence number, using the resources of the secondary storage system reserved for subsequent establishment of the remote point-in-time snap copy relationship, as a function of the state of the consistency group formation process in progress at the time of receipt of the local-remote pair establish command. For example, the command logic 350 commands the secondary storage controller to establish (block 360, FIG. 7) the remote point-in-time snap copy relationship of the local-remote pair using the previously reserved resources of the secondary storage system for establishment of the remote point-in-time snap copy relationship, if the state of a consistency group formation process is determined to be in an idle state in which the local-remote pair establish command was received.

In the example of FIG. 5a for the consistency group CG0, all bits of the OOS bitmap1 have been reset such that the OOS bitmap1 is fully drained and the formation of the consistency group CG0 is complete and in the idle state. Thus, in the example of FIGS. 5a, 6 since the state of the consistency group formation process is determined (block 356, FIG. 7) to be in an idle state, CG0 idle, in which the local-remote pair snap copy establish command0 was received, the remote point-in-time snap copy relationship of the local-remote pair of snap copy relationships may be established without significant delay since no consistency group involving the data units volume2, volume2' of the local-remote pair establish command is in process of formation at the time of receipt of the local-remote pair snap copy establish command0. Accordingly, in the example of FIGS. 5a, 6, the state "Established" is stored in a state field of the data structure 336b (FIG. 5a) indicating that the remote snap copy having the sequence number SC_CG0 (of the point-in-time snap copy relationship CG0_R) of the local-remote snap copy pair has been established.

Because the state of the consistency group formation process for consistency group CG0 was in an idle state (CG0 Increment Complete) when the local-remote pair snap copy establish command0 was received, the volume2 of the consistency group CG0 is consistent with respect to volume1 of the primary system when the local-remote pair snap copy establish command0 was received. Accordingly, the local snap copy volume 1' will be consistent with the remote snap copy volume2'. Accordingly, the remote snap copy volume2' may be established without significant delay in response to the local-remote pair snap copy establish command0.

Conversely, the delay logic 348 delays (block 364, FIG. 7) establishment of the remote point-in-time snap copy relationship if the state of a consistency group formation process is determined to be in a draining state upon receipt of the local-remote pair snap copy establish command and if the consistency group being formed includes data units of the local-remote pair of snap relationships of the local-remote pair establish command. In the example of FIGS. 5b, 6, a local-remote pair snap copy establish command1 was received (block 316, FIG. 7) in the CG1 draining period following the start of the consistency group CG1, that is, after the point-in-time "start increment for CG1" of the consistency group CG1 but prior to the formation of the next-in-sequence consistency group CG2 at the point-in-time "start increment for CG2 of the consistency group CG2. Local-remote establish Command1 commands the establishment of a local snap copy of volume1 of the local storage system 24a and a remote snap copy of volume2 of the remote storage system 24b. At the time of receipt of the local-remote establish command1, volume2 is in the consistency group CG1 with respect to volume1 in this example.

In the example of FIG. 5b for the consistency group CG1, not all bits of the OOS bitmap1 have been reset such that the OOS bitmap1 is in the process of draining and the formation of the consistency group CG1 is incomplete and in the draining state. Accordingly, in the example of FIG. 5b, the consistency group logic 311 stores the consistency group sequence number CG1 and the state "draining" of the consistency group formation process in progress in corresponding sequence number and state fields of the consistency group formation data structure 312. The local-remote pair of snap copy relationships (FIG. 5b) to be established in response to the local-remote pair establish command1 are assigned (block 318, FIG. 7) by the sequence number determination logic 334, a snap copy sequence number, SC_CG1 in this example, which is a function of the particular consistency group formation process, "CG1 draining", in progress when the local-remote pair snap copy establish command1 was received as shown in FIG. 6. In the example of FIG. 5b, the sequence number determination logic 334 in response to the local-remote pair snap copy establish command1 (FIG. 6), obtains from the data structure 312 (FIG. 5b) of the consistency group logic 311, the consistency group sequence number CG1 of the consistency group formation process in progress at the time of receipt of the local-remote pair snap copy establish command1, and determines a snap copy sequence number SC_CG1 as a function of the particular consistency group formation process, "CG1 draining", in progress at the time of receipt of the local-remote pair snap copy establish command1. The snap copy sequence number SC_CG1 is stored in the snap copy sequence number field of the data structure 336a (FIG. 5b) for the local snap copy of the local-remote snap copy pair.

FIG. 5b depicts initiation of the establishment of a local-remote pair of snap copy relationships in response to the local-remote pair snap copy establish command1 using the determined snap copy sequence number SC_CG1. Thus, a local point-in-time snap copy relationship is established (block 340, FIG. 7) as represented by an arrow labeled "PIT snap copy relationshipCG1_L" in the primary storage system 24a, from a data unit such as the volume1 as a snap copy source, to another data unit such as the volume 1' as a snap copy target in the primary storage system 24a. In one embodiment, the snap copy generation logic 314 is further configured to, in establishing the local point-in-time snap copy relationship, here the PIT snap copy relationshipCG1_L, generate a local target bitmapCG1_L of bitmaps 244b indicating tracks which have not been copied from the primary volume1 to the local point-in-time snap copy volume 1' as of a particular point-in-time.

The snap copy generation logic 314 initiates and establishes (block 340, FIG. 7) the local point-in-time snap copy relationship of the local-remote pair independently of the state of a consistency group formation process. Accordingly, in the example of FIGS. 5b, 6, the state of the local point-in-time snap copy relationship CG1__L is stored as "Established" in the state field of the data structure 336a (FIG. 5b) for the local snap copy of the local-remote snap copy pair, indicating that the local snap copy having the sequence number SC_CG1 (of the point-in-time snap copy relationship CG1_L) of the local-remote snap copy pair has been established.

The local-remote pair of snap copy relationships established in response to the local-remote pair establish command1 eventually will include a remote point-in-time snap copy relationship as represented by an arrow labeled "PIT snap copy relationshipCG1_R" (FIG. 5c) in the secondary storage system 24b from a data unit such as the volume2 of the consistency group CG1 as a snap copy source, to another data unit volume2' as a snap copy target in the secondary storage system 24b. As described above, in one aspect of the present description, the establishment of the remote point-in-time snap copy relationship of the local-remote pair of snap copy relationships, may be delayed as a function of the state of the consistency group formation process in progress at the time of receipt of the local-remote pair establish command. Accordingly, in the example of FIG. 5b, the arrow representing the PIT snap copy relationshipCG1_R is depicted in dotted lines since the remote snap copy has been delayed. Similarly, the target bitmapCG1_R for the PIT snap copy relationshipCG1_R is depicted in dotted lines in the example of FIG. 5b.

In connection with potential delay of establishment of the remote point-in-time snap copy relationship, the command logic 350 (FIG. 4) of the data replication logic of the primary storage controller 4a (FIG. 2) commands the secondary storage controller 4b (FIG. 2) to reserve (block 352, FIG. 7) resources of the secondary storage system for eventually establishing the remote snap copy relationship of the local-remote pair. The resources are reserved using the sequence number determined (block 318, FIG. 7) for the local-remote pair. In the example of FIGS. 5b, 6, the command logic 350 of the data replication logic 234 of the primary storage controller 4a (FIG. 2) issues a resource reservation command to the secondary storage controller 4b in response to the local-remote pair establish command1, to reserve resources of the secondary storage system during a reservation interval for subsequent establishment of the remote point-in-time snap copy relationshipCG1_R of the local-remote pair following completion of the reservation interval for the snap copy relationshipCG1_R. For example, memory space for snap copy volumes such as the volume2' and data structures such as the target bitmapCG1_R may be reserved pending establishment of the remote PIT snap copy relationshipCG1_R.

Further in response to the resource reservation command, the determined snap copy sequence number (block 318, FIG. 7) is stored in the snap copy sequence number field of a data structure 336b (FIG. 5b) for the remote snap copy of the local-remote snap copy pair. Thus, in the example of FIGS. 5b, 6, in response to the resource reservation command issued in response to the local-remote pair establish command1, the snap copy sequence number SC_CG1 is stored in the snap copy sequence number field of the data structure 336b (FIG. 5a) for the remote snap copy of the local-remote snap copy pair.

In the example of FIG. 5b, set bits such as set bit 2 of the OOS bitmap1 indicate unprocessed updates awaiting transfer to the secondary storage such that volume2 of the consistency group CG1 is not yet consistent with volume1 as of the point in time at which updates were no longer added to the OOS bitmap1. Thus, in the example of FIG. 5b, the draining interval, CG1 draining, has not yet completed because the OOS bitmap1 (FIG. 5b) is not yet fully drained (FIG. 5c) such that all incremental updates of the consistency group have not yet been successfully copied from the primary storage to the secondary storage and as a result, all bits of the OOS bitmap1 (FIG. 5b) have not yet been reset.

Thus, in the example of the local-remote pair snap copy establish command1 of FIG. 6, the state determination logic 344 (FIG. 4) of the snap copy generation logic 314 of the primary storage controller 4a (FIG. 2), determines (block 356, FIG. 7) the state of a consistency group formation process upon receipt of the local-remote pair snap copy establish command1 to be the CG1 draining state as indicated by the consistency group formation data structure 312 (FIG. 5b) and the timeline of FIG. 6. In the example of FIG. 5b, the state determination logic 344 obtains from the data structure 312 (FIG. 5a) of the consistency group logic 311, the state, CG1 draining, of the consistency group formation process in progress. Accordingly, delay logic 348 of the snap copy generation logic 314 delays (block 364) establishment of the remote point-in-time snap copy relationshipCG1_R of the local-remote pair of snap copy relationships since the state of the consistency group formation process in progress at the time of receipt of the local-remote pair establish command1 is determined by the state determination logic 344 to be the CG1 draining state. The establishment of the remote point-in-time snap copy relationshipCG1_R is delayed for an interval of time, referred to as the "reservation interval" in the timeline of FIG. 6. Consequently, the state "Reserved" is stored in the state field of the data structure 336b (FIG. 5a) indicating that the remote snap copy having the sequence number SC_CG1 (of the point-in-time snap copy relationship CG1_R) of the local-remote snap copy pair has not yet been established but is in the reserved state pending being established at a subsequent time.

Because the state of the consistency group formation process for consistency group CG1 was in a draining state (CG1 draining) when the local-remote pair snap copy establish command1 was received, the volume2 of the consistency group CG1 is not consistent with respect to volume1 of the primary system when the local-remote pair snap copy establish command1 was received. Accordingly, the local snap copy volume 1' will not be consistent with a remote snap copy volume2'. Accordingly, establishment of the remote snap copy volume2' will be delayed.

The reservation interval for delaying the establishing of the remote snap copy of the local-remote pair ends once the increment portion of the consistency group formation process of consistency group CG1 is complete as indicated by the point-in-time "increment complete" for the consistency group CG1 being formed. As previously mentioned, the CG1 draining interval is complete once the OOS bitmap1 for the consistency group is fully drained such that all incremental updates of the consistency group CG1 have been successfully copied from the primary storage volume1' to the secondary storage volume2' and as a result, all bits of the OOS bitmap1 have been reset as shown in FIG. 5c.

Upon completion of the draining interval of consistency group CG1, the remote mirror snap copy formed at the point-in-time "remote mirror snap copy establish for CG1" is assigned a sequence number "CG1" as indicated in the timeline of the embodiment of FIG. 6. Once the remote mirror snap copy has been established as indicated in the timeline of FIG. 6, the increment portion of the consistency group formation process may be deemed complete ("increment complete") for the consistency group CG1 being formed. Accordingly, as shown in FIG. 5c, the consistency group logic 311 stores the consistency group state "Increment Complete" for the consistency group formation process in progress in the corresponding state field of the consistency group formation data structure 312 for the consistency group CG1.

The state determination logic 344 (FIG. 4) of the snap copy generation logic 314, determines (block 356, FIG. 7) the state of a consistency group formation process for the local-remote pair snap copy establish command1 to be the CG1 Increment Complete state as indicated by the consistency group formation data structure 312 (FIG. 5c) and the timeline of FIG. 6. In the example of FIG. 5c, the state determination logic 344 obtains from the data structure 312 (FIG. 5c) of the consistency group logic 311, the state Increment Complete) of the consistency group CG1 formation process in progress.

Accordingly, the delay logic 348 terminates (block 370, FIG. 7) delay of establishment of the remote point-in-time snap copy relationshipCG1_R of the local-remote pair once the state of the consistency group formation process for the consistency group CG1 is determined to be in an increment complete state following the CG1 draining state in which the local-remote pair establish command1 was received. In addition, the command logic 350 is further configured to issue (block 374) to the secondary storage controller a "check-in" command to establish (block 360, FIG. 7) the remote point-in-time snap copy relationshipCG1_R of the local-remote pair using the reserved resources of the secondary storage system reserved for subsequent establishment of the remote point-in-time snap copy relationshipCG1_R of the local-remote pair, once the state of the consistency group formation process for the consistency group CG1 is determined to be in the increment complete state following the CG1 draining state in which the local-remote pair establish command1 was received. Thus, in response to the check-in command, the secondary storage controller establishes the remote point-in-time snap copy relationshipCG1_R (FIG. 5c) of the local-remote pair using the resources of the secondary storage system reserved for the subsequent establishment of the remote point-in-time snap copy relationshipCG1_R once the state of the consistency group formation process for the consistency group CG1 is determined to be in an idle state (that is, increment complete state). In one embodiment, the secondary storage controller is further configured to, in establishing the remote point-in-time snap copy relationship, PIT snap copy relationshipCG1_R, generate a remote target bitmapCG1_R (FIG. 5c) of bitmaps 244b indicating tracks which have not been copied from the primary volume2 to the point-in-time snap copy volume 2' as of a particular point-in-time.

Because the state of the consistency group formation process for consistency group CG1 was in a draining state (CG1 draining) when the local-remote pair snap copy establish command1 was received, the establishment of the remote snap copy volume2' was delayed until the volume2 of the consistency group CG1 is consistent with respect to volume1 of the primary system. As a result, the local snap copy volume 1' will be consistent with the remote snap copy volume2'. Accordingly, the remote snap copy volume2' is established after the consistency group CG1 is complete.

In another example of 6, a local-remote pair snap copy establish command2 was received (block 316, FIG. 7) in the CG2 draining period following the start of the consistency group CG2, that is, the point-in-time "start increment for CG1" of the consistency group CG1 but prior to the formation of the next-in-sequence consistency group. Local-remote establish Command2 commands the establishment of a local snap copy of volume1 of the local storage system 24a and a remote snap copy of volume2 of the remote storage system 24b. At the time of receipt of the local-remote establish command2, volume2 is in the consistency group CG2 with respect to volume1 in this example. Accordingly, a local-remote pair of snap copy relationships are established in a manner similar to that described above in connection with local-remote pair establish command1.

The consistency group logic 311 stores the consistency group sequence number CG2 and the state "draining" of the consistency group formation process in progress in corresponding sequence number and state fields of a data structure such as the consistency group formation data structure 312. The local-remote pair of snap copy relationships established in response to the local-remote pair establish command2 are assigned (block 318, FIG. 7) by the sequence number determination logic 334, a snap copy sequence number, SC_CG2 in this example, which is a function of the particular consistency group formation process, "CG2 draining", in progress when the local-remote pair snap copy establish command2 was received as shown in FIG. 6. The sequence number determination logic 334 in response to the local-remote pair snap copy establish command2 (FIG. 6), obtains from the data structure 312 of the consistency group logic 311, the consistency group sequence number CG2 of the consistency group formation process in progress at the time of receipt of the local-remote pair snap copy establish command2, and determines a snap copy sequence number SC_CG2 as a function of the particular consistency group formation process, "CG2 draining", in progress at the time of receipt of the local-remote pair snap copy establish command2. The snap copy sequence number SC_CG2 is stored in a snap copy sequence number field of a data structure such as the data structure 336a for the local snap copy of the local-remote snap copy pair.

A local point-in-time snap copy relationship is established (block 340, FIG. 7) in the primary storage system 24a, from a data unit as a snap copy source, to another data unit such as a snap copy target in the primary storage system 24a. In one embodiment, the snap copy generation logic 314 is further configured to, in establishing the local point-in-time snap copy relationship, generate a local target bitmap indicating tracks which have not been copied from the primary volume to the local point-in-time snap copy volume as of a particular point-in-time.

The snap copy generation logic 314 initiates and establishes (block 340, FIG. 7) the local point-in-time snap copy relationship of the local-remote pair independently of the state of a consistency group formation process. Accordingly, in the command 2 example of FIG. 6, the state of the local point-in-time snap copy relationship which may be numbered as, CG2_L, for example is stored as "Established" in a state field of a data structure for the local snap copy of the local-remote snap copy pair, indicating that the local snap copy having a sequence number (such as SC_CG2, for example) of the local-remote snap copy pair has been established.

The local-remote pair of snap copy relationships established in response to the local-remote pair establish command2 eventually will include a remote point-in-time snap copy relationship in the secondary storage system 24b from a data unit as a snap copy source, to another data unit as a snap copy target in the secondary storage system 24b. As described above, in one aspect of the present description, the establishment of the remote point-in-time snap copy relationship of the local-remote pair of snap copy relationships, may be delayed as a function of the state of the consistency group formation process in progress at the time of receipt of the local-remote pair establish command.

In connection with potential delay of establishment of the remote point-in-time snap copy relationship, the command logic 350 (FIG. 4) of the data replication logic of the primary storage controller 4a (FIG. 2) commands the secondary storage controller 4b (FIG. 2) to reserve (block 352, FIG. 7) resources of the secondary storage system for eventually establishing the remote snap copy relationship of the local-remote pair. The resources are reserved using the sequence number determined (block 318, FIG. 7) for the local-remote pair. In the example of command2 of FIG. 6, the command logic 350 of the data replication logic 234 of the primary storage controller 4a (FIG. 2) issues a resource reservation command to the secondary storage controller 4b in response to the local-remote pair establish command2, to reserve resources of the secondary storage system during a reservation interval for subsequent establishment of the remote point-in-time snap copy relationship of the local-remote pair following completion of the reservation interval for the remote snap copy relationship. For example, memory space for a snap copy volume and memory space for data structures such as the remote target bitmap may be reserved pending establishment of the remote PIT snap copy relationship.

Further in response to the resource reservation command, the determined snap copy sequence number (block 318, FIG. 7) is stored in the snap copy sequence number field of a data structure for the remote snap copy of the local-remote snap copy pair. Thus, in the example of command2 of FIG. 6, in response to the resource reservation command issued in response to the local-remote pair establish command2, the snap copy sequence number SC_CG2 (FIG. 6) is stored in the snap copy sequence number field of the data structure for the remote snap copy of the local-remote snap copy pair.

In the example of the local-remote pair snap copy establish command2 of FIG. 6, the state determination logic 344 (FIG. 4) of the snap copy generation logic 314 of the primary storage controller 4a (FIG. 2), determines (block 356, FIG. 7) the state of a consistency group formation process upon receipt of the local-remote pair snap copy establish command2, to be the CG2 draining state as indicated by a consistency group formation data structure and the timeline of FIG. 6. In the example of command2, the state determination logic 344 obtains from the data structure of the consistency group logic 311, the state, CG2 draining, of the consistency group formation process in progress. Accordingly, delay logic 348 of the snap copy generation logic 314 delays (block 364) establishment of the remote point-in-time snap copy relationship of the local-remote pair of snap copy relationships since the state of the consistency group formation process in progress at the time of receipt of the local-remote pair establish command2 is determined by the state determination logic 344 to be the CG2 draining state. The establishment of the remote point-in-time snap copy relationshipCG2_R is delayed for an interval of time, referred to as the "reservation interval" in the timeline of FIG. 6. Consequently, the state "Reserved" is stored in a state field of the data structure for the remote snap copy indicating that the remote snap copy having the snap copy sequence number SC_CG2 of the local-remote snap copy pair has not yet been established but is in the reserved state pending being established at a subsequent time.

The reservation interval for delaying the establishing of the remote snap copy of the local-remote pair ends once the increment portion of the consistency group formation process of consistency group CG2 is complete (indicated by the point-in-time "increment complete") for the consistency group CG2 being formed. As previously mentioned, the CG2 draining interval is complete once the OOS bitmap for the consistency group is fully drained such that all incremental updates of the consistency group CG2 have been successfully copied from the primary storage volume to the secondary storage volume and as a result, all bits of the OOS bitmap have been reset.

Upon completion of the draining interval of consistency group CG2, the remote mirror snap copy formed at the point-in-time "remote mirror snap copy establish for CG2" is assigned a sequence number "CG2" as indicated in the timeline of the embodiment of FIG. 6. Once the remote mirror snap copy has been established as indicated in the timeline of FIG. 6, the increment portion of the consistency group formation process may be deemed complete ("increment complete") for the consistency group CG2 being formed. Accordingly, the consistency group logic 311 stores the consistency group state "Increment Complete" for the consistency group formation process in progress in the corresponding state field of the consistency group formation data structure for the consistency group CG2.

At that point, the state determination logic 344 (FIG. 4) of the snap copy generation logic 314, determines (block 356, FIG. 7) the state of a consistency group formation process for the local-remote pair snap copy establish command2 to be the CG2 Increment Complete state as indicated by the consistency group formation data structure and the timeline of FIG. 6. Thus, the state determination logic 344 obtains from the data structure (FIG. 5c) of the consistency group logic 311, the state (CG2 Increment Complete) of the consistency group CG2 formation process in progress.

Accordingly, the delay logic 348 terminates (block 370, FIG. 7) delay of establishment of the remote point-in-time snap copy relationship of the local-remote pair once the state of the consistency group formation process for the consistency group CG2 is determined to be in an increment complete state following the CG2 draining state in which the local-remote pair establish command2 was received. In addition, the command logic 350 is further configured to issue (block 374) to the secondary storage controller a check-in command to establish (block 360, FIG. 7) the remote point-in-time snap copy relationship of the local-remote pair using the reserved resources of the secondary storage system reserved for subsequent establishment of the remote point-in-time snap copy relationship of the local-remote pair, once the state of the consistency group formation process for the consistency group CG2 is determined to be in the increment complete state following the CG2 draining state in which the local-remote pair establish command2 was received. Thus, in response to the check-in command, the secondary storage controller establishes the remote point-in-time snap copy relationship of the local-remote pair using the resources of the secondary storage system reserved for the subsequent establishment of the remote point-in-time snap copy relationship once the state of the consistency group formation process for the consistency group CG2 is determined to be in the CG2 idle state (that is, increment complete state) in which the local-remote pair establish command2 was received. In one embodiment, the secondary storage controller is further configured to, in establishing the remote point-in-time snap copy relationship generate a remote target bitmap of bitmaps 244b indicating tracks which have not been copied from the primary volume to the point-in-time snap copy volume as of a particular point-in-time.

In one embodiment, the local-remote pair point-in-time snap copy command which generates the point-in-time snap copies may be of a "no background copy" type in which the content of the source volume need not be transferred to the point-in-time snap copy target volume in a background copy operation. Instead, a read operation directed to a track of the point-in-time snap copy target volume may be redirected to the corresponding track of the source volume to obtain the content of that track if the target bitmap indicates by a bit state value "1" that the track has not been transferred to the point-in-time snap copy target volume. However, should a track of the source volume be targeted for an update, the content of that track will be transferred to the corresponding track of the point-in-time snap copy target volume and the associated target bitmap will be updated to indicate that the content of that track has been transferred. Accordingly, data for the target to provide a consistent point-in-time snap copy of the data of the source volume as of the first point-in-time may be obtained by data transfers within the associated local or remote system.

It is appreciated that in other embodiments, the local-remote pair point-in-time snap copy command which generates the point-in-time snap copies may a "background copy" type in which the content of the source volume is transferred in a background copy operation to the point-in-time snap copy target volume. As the content of each track of the source volume is transferred in a background copy to the content of the corresponding track of the point-in-time snap copy target volume, the bit state of the bit representing that track in the associated target bitmap may be updated to a bit state value "0" to indicate that the track has been transferred to the point-in-time snap copy target volume.

Thus, as used herein, the term "copying" includes actual copying in which data content of a source storage location is actually transferred to a target storage location. However, the term "copying" as used herein also includes virtual copying in which a data structure such as a bitmap is set to redirect read operations initially directed to a target storage location, to a source storage location instead of the target storage location, and thus need not include actual transfer of the data content of a source storage location to a target storage location. Similarly, as used herein, the term "copy" includes an actual copy in which a target storage location contains the same data content as a source storage location but also includes a virtual copy in which a target storage location has an associated data structure such as a target bitmap which has been set to redirect read operations initially directed to the target storage location, to the source storage location instead of the target storage location, such that a virtual copy need not include the actual data content of the source storage location.

In one aspect of the present description, it is appreciated that once the consistency group has completed, data for the remote point-in-time snap copy volume2' already resides on the secondary system 24b due to the mirroring operation as represented by the mirror relationship1 (FIGS. 5a, 5c). As a result, in many applications most if not all of the data for the remote point-in-time snap copy volume2' may be copied within the secondary system 24b, thereby obviating much if not all copying of data over a network from the primary system 24a to provide the remote point-in-time snap copy volume2'. For example, in response to the command logic 350 issuing a check-in command to the secondary system 24b, the snap copy generation logic 314 of the secondary storage controller 4b, is further configured to command the secondary system to background copy tracks of the secondary volume2 to the remote point-in-time snap copy volume2' if the remote target bitmap indicates data tracks remain to be copied from the secondary volume2 to the remote point-in-time snap copy volume2'. Accordingly, data for the volume2' to provide a consistent point-in-time snap copy of the data of the primary volume1 as of the first point-in-time may be obtained primarily by data transfers within the secondary system 24b.

Figure 8:
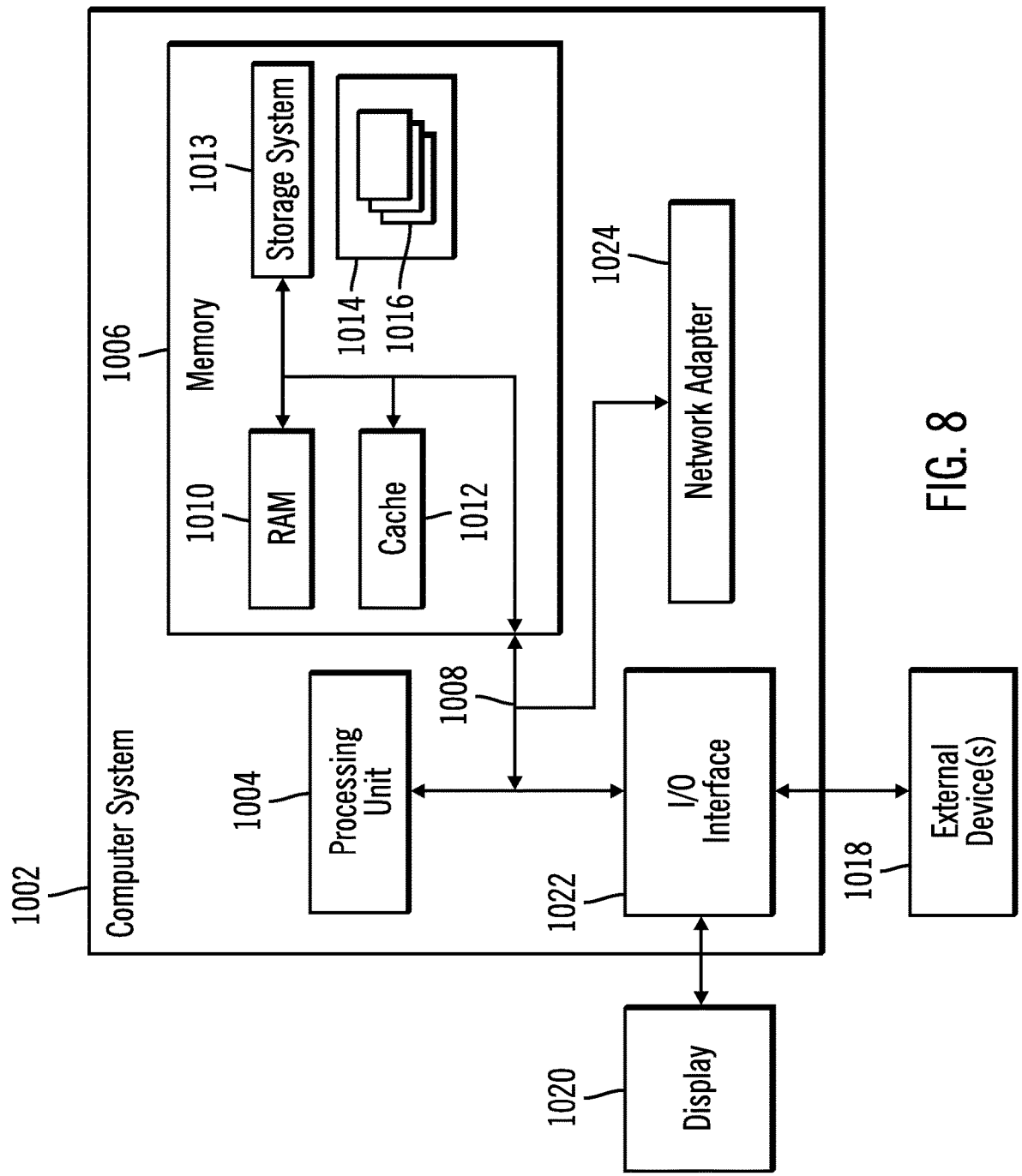
FIG. 8 illustrates a computer embodiment employing asynchronous local and remote generation of consistent point-in-time snap copies in consistency groups in accordance with the present description.

The computational components of the figures may each be implemented in one or more computer systems, such as the computer system 1002 shown in FIG. 8. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A primary storage controller for use with a host and a primary storage system at a first location, the primary storage system having a primary storage controller and at least one storage unit controlled by the primary storage controller and configured to store a plurality of data units, and a secondary storage system at a second location remote from the first location, the secondary storage system having a secondary storage controller and at least one storage unit controlled by the secondary storage controller and configured to store a plurality of data units, the primary storage controller comprising data replication logic which includes:

data mirroring logic configured to asynchronously mirror data from a first data unit stored in a storage unit of the primary storage system, to a second data unit stored in a storage unit of the secondary storage system, and to mirror data asynchronously from a third data unit stored in a storage unit of the primary storage system, to a fourth data unit stored in a storage unit of the secondary storage system; and consistency group logic configured to generate a consistency group of data units of storage units of the secondary storage system with respect to storage units of the primary storage system; and snap copy generation logic configured to receive a local-remote pair establish command to establish a local-remote pair of snap copy relationships including a local point-in-time snap copy relationship in the primary storage system, from the first data unit as a snap copy source, to the third data unit as a snap copy target, and including a remote point-in-time snap copy relationship in the secondary storage system from the second data unit as a snap copy source, to the fourth data unit as a snap copy target and, in response to the local-remote pair establish command, to initiate a local-remote pair of snap copy relationships, the snap copy generation logic including:

delay logic configured to selectively delay establishment of a remote point-in-time snap copy relationship as a function of a state of a consistency group formation process for consistency groups which include at least one of the second and fourth data units.

2. The primary storage controller of claim 1 wherein the snap copy generation logic further includes command logic configured to issue a resource reservation command to the secondary storage controller in response to the local-remote pair establish command, to reserve resources of the secondary storage system for subsequent establishment of the remote point-in-time snap copy relationship of the local-remote pair.

3. The primary storage controller of claim 1 wherein the snap copy generation logic is further configured to initiate and establish the local point-in-time snap copy relationship of the local-remote pair independently of the state of a consistency group formation process.

4. The primary storage controller of claim 2 further comprising state determination logic configured to determine a state of a consistency group formation process upon receipt of the local-remote pair establish command as at least one of a plurality of states wherein the plurality of states includes an idle state and a draining state wherein an idle state exists in which no consistency group which includes at least one of the second and fourth data units is actively forming and wherein a draining state exists in which a consistency group which includes at least one of the second and fourth data units is actively forming;
wherein the delay logic is configured to selectively delay establishment of a remote point-in-time snap copy relationship if the state of a consistency group formation process is determined to be in a draining state in which a consistency group which includes at least one of the second and fourth data units is actively forming in a draining state upon receipt of the local-remote pair establish command;
wherein the idle state is an increment complete state following completion of the draining state, and wherein the delay logic is further configured to terminate delay of establishment of the remote point-in-time snap copy relationship of the local-remote pair if the state of a consistency group formation process is determined to be in an increment complete state following a draining state in which the local-remote pair establish command was received; and
wherein the command logic is further configured to issue to the secondary storage controller a check-in command to establish the remote point-in-time snap copy relationship of the local-remote pair using the reserved resources of the secondary storage system reserved for subsequent establishment of the remote point-in-time snap copy relationship of the local-remote pair, if the state of a consistency group formation process is determined to be in an increment complete state following a draining state in which the local-remote pair establish command was received.

5. The primary storage controller of claim 2 wherein the command logic is further configured to command the secondary storage controller to establish the remote point-in-time snap copy relationship of the local-remote pair using the resources of the secondary storage system reserved for subsequent establishment of the remote point-in-time snap copy relationship, if the state of a consistency group formation process is determined to be in an idle state in which the local-remote pair establish command was received.

6. The primary storage controller of claim 2 wherein the snap copy generation logic further includes sequence number determination logic configured to determine a snap copy sequence number as a function of a consistency group formation process in response to the local-remote pair establish command, and wherein the command logic is further configured to issue the resource reservation command to the secondary storage controller in response to the local-remote pair establish command, to reserve resources of the secondary storage system in association with the determined snap copy sequence number, for subsequent establishment of the remote point-in-time snap copy relationship of the local-remote pair, in association with the determined snap copy sequence number.

7. The primary storage controller of claim 6 wherein the command logic is further configured to command the secondary storage controller to establish the remote point-in-time snap copy relationship of the local-remote pair in association with the determined snap copy sequence number, and wherein the consistency group logic is further configured to associate a consistency group sequence number to a particular consistency group formation process.

8. The primary storage controller of claim 1 wherein the first data unit is a first volume and the second data unit is a second volume.

9. A method, comprising:
mirroring data asynchronously from a first data unit stored in a storage unit of a first storage system at a first location, to a second data unit stored in a storage unit of a second storage system at a second location;
mirroring data asynchronously from a third data unit stored in a storage unit at the first location, to a fourth data unit stored in a storage unit at the second location;
receiving a local-remote pair establish command to establish a local-remote pair of point-in-time snap copy relationships including a local point-in-time snap copy relationship in the first storage system, from the first data unit as a snap copy source, to the third data unit as a snap copy target, and including a remote point-in-time snap copy relationship in the second storage system from the second data unit as a snap copy source, to the fourth data unit as a snap copy target, and
in response to the local-remote pair establish command, initiating a local-remote pair of point-in-time snap copy relationships including upon receipt of the local-remote pair establish command, selectively delaying establishment of a remote point-in-time snap copy relationship as a function of a state of a consistency group formation process for consistency groups which include at least one of the second and fourth data units.

10. The method of claim 9 wherein the initiating includes reserving resources of the second storage system for subsequent establishment of the remote point-in-time snap copy relationship.

11. The method of claim 10 further comprising:
determining a state of a consistency group formation process upon receipt of the local-remote pair establish command as at least one of a plurality of states wherein the plurality of states includes an idle state and a draining state wherein an idle state exists in which no consistency group which includes at least one of the second and fourth data units is actively forming and wherein a draining state exists in which a consistency group which includes the at least one of the second and fourth data units is actively forming; and
delaying establishment of the remote point-in-time snap copy relationship if the state of a consistency group formation process is determined to be in a draining state in which a consistency group which includes at least one of the second and fourth data units is actively forming in a draining state upon receipt of the local-remote pair establish command;
wherein the plurality of states further includes an increment complete state following completion of the draining state, wherein delaying establishment of the remote point-in-time snap copy relationship is terminated if the state of a consistency group formation process is determined to be in an increment complete state following a draining state in which the local-remote pair establish command was received; and wherein initiating a local-remote pair of point-in-time snap copy relationships further includes establishing the remote point-in-time snap copy relationship using the resources of the second storage system reserved for subsequent establishment of the remote point-in-time snap copy relationship, if the state of a consistency group formation process is determined to be in an increment complete state following a draining state in which the local-remote pair establish command was received.

12. The method of claim 10 wherein initiating a local-remote pair of point-in-time snap copy relationships further includes establishing the remote point-in-time snap copy relationship using the resources of the second storage system reserved for subsequent establishment of the remote point-in-time snap copy relationship, if the state of a consistency group formation process is determined to be in an idle state in which the local-remote pair establish command was received.

13. The method of claim 12 wherein initiating a local-remote pair of point-in-time snap copy relationships further includes determining a snap copy sequence number as a function of a consistency group formation process upon receipt of the local-remote pair establish command, and associating the resource reserving for subsequent establishment of the remote point-in-time snap copy relationship to the determined snap copy sequence number.

14. The method of claim 13 wherein the initiating a local-remote pair of point-in-time snap copy relationships further includes associating the remote point-in-time snap copy relationship establishing to the determined snap copy sequence number, and wherein associating a consistency group sequence number to a particular consistency group formation process.

15. The method of claim 9 wherein the initiating a local-remote pair of point-in-time snap copy relationships further includes establishing the local point-in-time snap copy relationship independently of the state of a consistency group formation process.

16. The method of claim 9 wherein the first data unit is a first volume and the second data unit is a second volume.

17. A computer program product for use with a host and a primary storage system at a first location, the primary storage system having a primary storage controller and a first storage unit controlled by the primary storage controller and configured to store a plurality of data units, and a secondary storage system at a second location remote from the first location, the secondary storage system having a secondary storage controller and a second storage unit controlled by the secondary storage controller and configured to store a plurality of data units, wherein the computer program product comprises a computer readable storage medium having program instructions embodied therewith, the program instructions executable by a processor of a storage system to cause processor operations, the processor operations comprising:

mirroring data asynchronously from a first data unit stored in a storage unit of a first storage system at a first location, to a second data unit stored in a storage unit of a second storage system at a second location;

mirroring data asynchronously from a third data unit stored in a storage unit at the first location, to a fourth data unit stored in a storage unit at the second location;

receiving a local-remote pair establish command to establish a local-remote pair of point-in-time snap copy relationships including a local point-in-time snap copy relationship in the first storage system, from the first data unit as a snap copy source, to the third data unit as a snap copy target, and including a remote point-in-time snap copy relationship in the second storage system from the second data unit as a snap copy source, to the fourth data unit as a snap copy target, and in response to the local-remote pair establish command, initiating a local-remote pair of point-in-time snap copy relationships including upon receipt of the local-remote pair establish command, selectively delaying establishment of a remote point-in-time snap copy relationship as a function of a state of a consistency group formation process for consistency groups which include at least one of the second and fourth data units.

18. The computer program product of claim 17 wherein the initiating includes reserving resources of the second storage system for subsequent establishment of the remote point-in-time snap copy relationship.

19. The computer program product of claim 18 wherein the operations further comprise:

determining a state of a consistency group formation process upon receipt of the local-remote pair establish command as at least one of a plurality of states wherein the plurality of states includes an idle state and a draining state wherein an idle state exists in which no consistency group which includes at least one of the second and fourth data units is actively forming and wherein a draining state exists in which a consistency group which includes the at least one of the second and fourth data units is actively forming; and delaying establishment of the remote point-in-time snap copy relationship if the state of a consistency group formation process is determined to be in a draining state in which a consistency group which includes at least one of the second and fourth data units is actively forming in a draining state upon receipt of the local-remote pair establish command;

wherein the plurality of states further includes an increment complete state following completion of the draining state, wherein delaying establishment of the remote point-in-time snap copy relationship is terminated if the state of a consistency group formation process is determined to be in an increment complete state following a draining state in which the local-remote pair establish command was received; and wherein initiating a local-remote pair of point-in-time snap copy relationships further includes establishing the remote point-in-time snap copy relationship using the resources of the second storage system reserved for subsequent establishment of the remote point-in-time snap copy relationship, if the state of a consistency group formation process is determined to be in an increment complete state following a draining state in which the local-remote pair establish command was received.

20. The computer program product of claim 18 wherein initiating a local-remote pair of point-in-time snap copy relationships further includes establishing the remote point-in-time snap copy relationship using the resources of the second storage system reserved for subsequent establishment of the remote point-in-time snap copy relationship, if the state of a consistency group formation process is determined to be in an idle state in which the local-remote pair establish command was received.

21. The computer program product of claim 20 wherein initiating a local-remote pair of point-in-time snap copy relationships further includes determining a snap copy sequence number as a function of a consistency group formation process upon receipt of the local-remote pair establish command, and associating the resource reserving for subsequent establishment of the remote point-in-time snap copy relationship to the determined snap copy sequence number.

22. The computer program product of claim 21 wherein the initiating a local-remote pair of point-in-time snap copy relationships further includes associating the remote point-in-time snap copy relationship establishing to the determined snap copy sequence number, and wherein associating a consistency group sequence number to a particular consistency group formation process.

23. The computer program product of claim 17 wherein the initiating a local-remote pair of point-in-time snap copy relationships further includes establishing the local point-in-time snap copy relationship independently of the state of a consistency group formation process.

24. The computer program product of claim 17 wherein the first data unit is a first volume and the second data unit is a second volume.

* * * * *